United States Patent
Koren et al.

(10) Patent No.: US 8,937,889 B2
(45) Date of Patent: Jan. 20, 2015

(54) DECOUPLED CASCADED MIXERS ARCHITECHTURE AND RELATED METHODS

(75) Inventors: Eitan Koren, Raanana (IL); Yosi Rahamim, Tel Aviv-Yaffo (IL); Itzhak Shperling, Bnei Brak (IL); Abraham Tooba, Rishon Lezion (IL); Nira Yalon, Modin (IL)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/434,721

(22) Filed: Mar. 29, 2012

(65) Prior Publication Data

US 2012/0188914 A1     Jul. 26, 2012

Related U.S. Application Data

(62) Division of application No. 12/644,247, filed on Dec. 22, 2009, now Pat. No. 8,169,936.

(51) Int. Cl.
*H04L 12/16* (2006.01)
*H04Q 11/00* (2006.01)

(52) U.S. Cl.
USPC .......................................... 370/261; 370/263

(58) Field of Classification Search
CPC .............................. H04L 12/16; H04W 28/00
USPC ................................................. 370/260–263
See application file for complete search history.

(56) References Cited

U.S. PATENT DOCUMENTS

| | | | |
|---|---|---|---|
| 4,013,840 A * | 3/1977 | Anderson | 370/261 |
| 4,229,814 A * | 10/1980 | Betts | 370/261 |
| 5,841,976 A | 11/1998 | Tai et al. | |
| 6,847,618 B2 * | 1/2005 | Laursen et al. | 370/261 |
| 7,216,143 B2 * | 5/2007 | Creamer et al. | 709/204 |
| 7,266,189 B1 | 9/2007 | Day | |
| 2001/0042114 A1 * | 11/2001 | Agraharam et al. | 709/223 |

(Continued)

FOREIGN PATENT DOCUMENTS

WO     2008082375 A2     7/2008

OTHER PUBLICATIONS

Cho. et al. "Distributed Management Architecture for Mul Timedia Conferencing Using SIP" Proceedings of the first International Conference on Distributed Frameworks for Multimedia Applications (DFMA'05); 0-7695-2273-4/05, IEEE.

(Continued)

*Primary Examiner* — Ronald Abelson
(74) *Attorney, Agent, or Firm* — Steven A. May

(57) ABSTRACT

Methods for inter-mixer communication enable a "self-formed" cascaded mixer node tree topology. One method enables inter-mixer node signaling and includes first selecting a plurality of media flow payloads at a first cascaded mixer node. A set of conference payloads are generated and each include the media flow payloads from the plurality of media flow payloads that are part of the same conference call, an identifier for the conference call, and a node identifier for each media flow in the conference call. For each media flow in the conference call, each conference payload further identifies whether the first cascaded mixer node is a root node or a leaf node. The set of conference payloads are bundled into a single packet and sent to a second cascaded mixer node. Another method enables the "self-forming" of the mixer node tree topology. Yet another method enables active talker identification within the "self-formed" tree topology.

13 Claims, 17 Drawing Sheets

(56) References Cited

U.S. PATENT DOCUMENTS

| | | | |
|---|---|---|---|
| 2002/0097857 A1* | 7/2002 | Kwan | 379/202.01 |
| 2003/0147357 A1* | 8/2003 | Zhang et al. | 370/260 |
| 2003/0198195 A1* | 10/2003 | Li | 370/260 |
| 2004/0047461 A1* | 3/2004 | Weisman et al. | 379/202.01 |
| 2004/0236829 A1* | 11/2004 | Xu et al. | 709/204 |
| 2005/0021616 A1 | 1/2005 | Rajahalme et al. | |
| 2005/0022098 A1* | 1/2005 | Vayanos et al. | 714/776 |
| 2005/0094579 A1 | 5/2005 | Acharya et al. | |
| 2007/0041366 A1 | 2/2007 | Vugenfirer et al. | |
| 2008/0069011 A1 | 3/2008 | Sekaran et al. | |
| 2008/0177833 A1 | 7/2008 | Gu et al. | |
| 2008/0239997 A1 | 10/2008 | Walker et al. | |
| 2009/0245260 A1* | 10/2009 | Mohaban et al. | 370/392 |
| 2010/0185956 A1* | 7/2010 | Anantharaman et al. | 715/753 |
| 2011/0145394 A1* | 6/2011 | Krzanowski et al. | 709/224 |

OTHER PUBLICATIONS

Y.H. Cho "Policy-Based Distributed Management Architecture for Large-Scale Enterprise Conferencing Service Using Sip" IEEE JSAC, vol. 23, No. 10, Oct. 2005.

A. Bouno.et al., "A Distributed IMS Enabled Conferencing Architecture on Top of a Standard Centralized Conferencing Framework" IEEE Comm. Mag. Mar. 2007.

International Search Report and Written Opinion for counterpart International Application PCT/US2010/058638 dated Aug. 31, 2011.

Notice of allowance mailed on Jan. 3, 2012 in counterpart U.S. Appl. No. 12/644,247, filed Dec. 22, 2009.

Requirement for Restriction mailed on Dec. 7, 2011 in counterpart U.S. Appl. No. 12/644,247, filed Dec. 22, 2009.

European Search Report for counterpart Patent Application No. 10843437.4 mailed Dec. 5, 2013.

Rosenberg, J., "A Framework for Conferencing with the Session Initiation Protocol (SIP); rfc4353.txt", Cisco Systems, 25 pages, (Feb. 1, 2006).

"Internet Protocol," IETF RFC 791, Darpa Internet Program, Protocol Specification, Sep. 1981, Retrieved from the Interenet URL: http://tools.ietf.org/pdf/rfc791.pdf on Oct. 17, 2014, pp. 1-49.

Postel, J. "User Datagram Protocol," IETF RFC 768, Aug. 28, 1980, Retrieved from the Internet URL: http://tools.ietf.org/pdf/rfc768.pdf on Oct. 17, 2014, pp. 1-3.

Rosenberg, J. et al., "SIP: Session Initiation Protocol," Network Working Group, Request for Comments (RFC) 3261, Jun. 2002, IETF (Internet Engineering Task Force), Retrieved from the Internet URL: https://www.ietf.org/rfc/rfc3261.txt on Oct. 17, 2014, pp. 1-248.

Schulzrinne, H. et al., "RTP: A Transport Protocol for Real-Time Applications," Network Working Group, IETF RFC 3550, Jul. 2003, Retrieved from the Internet URL: https://www.ietf.org/rfc/rfc3550.txt on Oct. 17, 2014, pp. 1-96.

\* cited by examiner

400

| 0 | 1 | 2 | 3 | 4 | 5 | 6 | 7 | 8 | 9 | 10 | 11 | 12 | 13 | 14 | 15 | |
|---|---|---|---|---|---|---|---|---|---|----|----|----|----|----|----|---|
| | | | | | | | | | | | | | | | | IP + UDP OVERHEAD |
| IP + UDP HEADERS (28 BYTES) | | | | | | | | | | | | | | | | |
| TIME STAMP (4 BYTES) | | | | | | | | | | | | | | | | GENERAL OVERHEAD |
| NBP | | | NODE LOAD | | | | | | | | | | | | | |
| | | | | | | CID | | | | | | | | | | |
| PL (1) | | | | | | | | | | PT (1) | | | | | D | BUNDLED PAYLOAD FOR CID |
| UID (1) | | | | | | NID (1) | | | | R | R | R | R | R | R | |
| SEQUENCE NUMBER (1) | | | | | | | | | | | | | | | | |
| PAYLOAD OF THE FIRST MEDIA-FLOW | | | | | | | | | | | | | | | | |
| PL (2) | | | | | | | | | | PT (2) | | | | | D | |
| UID (2) | | | | | | NID (2) | | | | R | R | R | R | R | R | |
| SEQUENCE NUMBER (2) | | | | | | | | | | | | | | | | |
| PAYLOAD OF THE SECOND MEDIA-FLOW | | | | | | | | | | | | | | | | |

*FIG. 4*

| 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|
| IP + UDP HEADERS (28 BYTES) ||||||||||||||||  IP + UDP OVERHEAD |
| TIME STAMP (4 BYTES) |||||||||||||||| GENERAL CMfP OVERHEAD |
| NODE LOAD ||||||||||||||||  |
| NBP ||| CID(1) ||||||||||||| BUNDLED PAYLOAD FOR CID (1) |
| PL (1.1) |||||||| PT (1.1) ||||||| D |
| UID (1.1) |||||| NID (1.1) ||||| R | R | R | R | R |  |
| SEQUENCE NUMBER (1.1) ||||||||||||||||  |
| PAYLOAD OF THE FIRST MEDIA-FLOW ON CONFERENCE CID (1) ||||||||||||||||  |
| PL (1.2) |||||||| PT (1.2) ||||||| D |
| UID (1.2) |||||| NID (1.2) ||||| R | R | R | R | R |  |
| SEQUENCE NUMBER (1.2) ||||||||||||||||  |
| MEDIA PAYLOAD OF THE SECOND MEDIA-FLOW ON CONFERENCE CID (1) ||||||||||||||||  |
| • ||||||||||||||||  |
| NBP ||| CID(N) ||||||||||||| BUNDLED PAYLOAD FOR CID (N) |
| PL (N.1) |||||||| PT (N.1) ||||||| D |
| UID (N.1) |||||| NID (N.1) ||||| R | R | R | R | R |  |
| SEQUENCE NUMBER (N.1) ||||||||||||||||  |
| PAYLOAD OF THE FIRST MEDIA-FLOW ON CONFERENCE CID (N) ||||||||||||||||  |
| PL (N.2) |||||||| PT (N.2) ||||||| D |
| UID (N.2) |||||| NID (N.2) ||||| R | R | R | R | R |  |
| SEQUENCE NUMBER (N.2) ||||||||||||||||  |
| PAYLOAD OF THE SECOND MEDIA-FLOW ON CONFERENCE CID (N) ||||||||||||||||  |

*FIG. 5*

DECOUPLED CASCADED MIXERS ARCHITECHTURE AND RELATED METHODS

TECHNICAL FIELD

The present disclosure relates generally to communication systems and in particular to a decoupled cascaded mixer node architecture and related methods.

BACKGROUND

"Real-time" communication between users over a network (meaning communication exchanged between networked users with negligible latency) has recently become a ubiquitous form of communication. Such real-time communication includes audio/video conferencing, Voice over Internet Protocol (VoIP), or instant messaging, among others. Moreover, each of these forms of real-time communication are implemented using Session Initiation Protocol (SIP) as described, for example, in Request for Comments (RFC) 3261 published June 2002 by IETF (Internet Engineering Task Force) Network Working Group and any subsequent revisions, wherein SIP is used to initiate, modify, and terminate communication sessions between user agents. SIP and other related or similar session protocols used to initiate, modify, and terminate communication sessions between users is referred to herein, generally, as "session control protocols".

A communication session or dialog within a session control protocol framework involving multiple users or "participants" is known as a "conference" or "conference call". The session control protocol framework (also referred to herein as a conferencing network) comprises a central Focus server (or simply Focus server) and one or more mixer nodes. Operationally, the Focus server implements a conference policy and exchanges session control protocol (e.g., SIP) signaling with conference participants to establish, modify, and terminate one or more conferences; and each mixer node receives one or more media streams from the conference participants, combines the media streams, and redistributes the one or more media streams to the conference participants.

At times, in the case of one or more conferences with a very large number of participants, a single mixer node may not be able to handle the media load. Accordingly, a single mixer node is replaced by a plurality of mixer nodes configured in a cascaded mixer node architecture, with each mixer node referred to herein as a "cascaded mixer node". In the case of a conferencing network with a cascaded mixer node architecture, to enhance system performance for conferences having a large number of participants and to balance media loads among all computational resources and communications pipelines in the system, the plurality of cascaded mixer nodes are distributed throughout a designated conferencing network, such as among others, a local area network (LAN) or a wide area network (WAN). In addition, for each active conference in the conferencing network, the cascaded mixer nodes are arranged in a tree topology with each mixer node in the tree topology connecting to at least one other mixer node and also connecting to the Focus server by a session control protocol dialog.

Current conferencing networks, that include a cascaded mixer node architecture, support a "fully-coupled model"; meaning that, not only does the Focus server implement the above-mentioned functionality of communication session control, the Focus server further establishes the mixer node tree topology per conference call and controls each mixer node's state within each conference tree as either a root node or a leaf node. In other words, in the "fully-coupled model", the Focus server in connection with a conference policy server (which stores and controls conference policy) are in full control over the distributed cascaded mixer nodes to implement, among other functions, command on a per-call tree topology, handling load problems in the cascaded mixer node architecture, handling failure events of cascaded mixer nodes, etc. While it can exploit the benefits of the cascaded mixer node architecture, the fully-coupled model suffers from an increased computational load on the conference policy server and the Focus server, and it is tied to a specific conference policy server and Focus server; thus, a failure of the Focus server or an inability of the Focus server to access the conference policy server will effectively shut down all conferences in the network.

Accordingly, there is a need for a decoupled cascaded mixer node architecture and related methods.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

FIG. 4 illustrates a bundled media packet in accordance with some embodiments.

FIG. 5 illustrates a bundled media packet in accordance with alternative embodiments.

Figure 1:
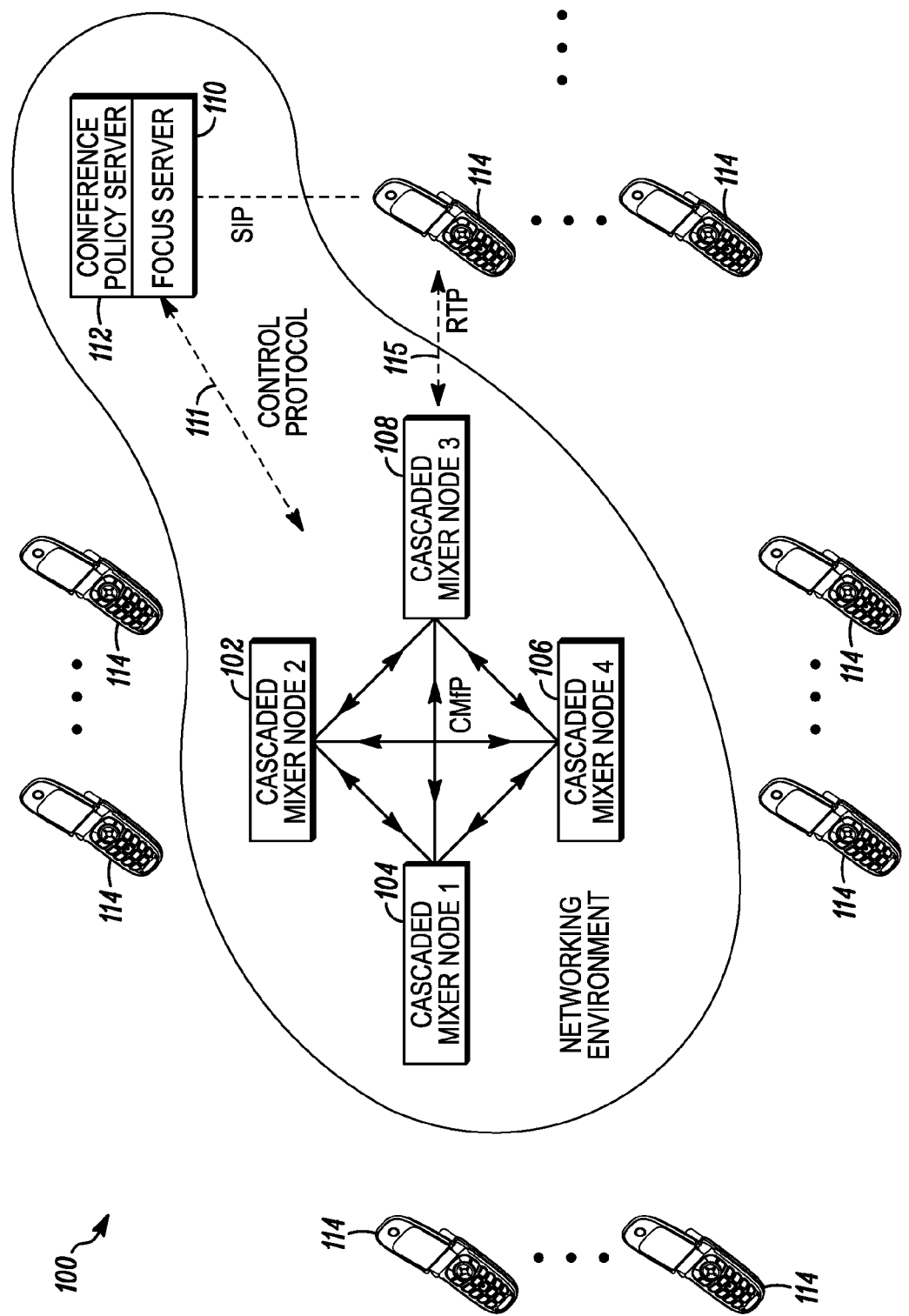
FIG. 1 illustrates a system comprising a network of cascaded mixer nodes in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a decoupled cascaded mixer node framework and related methods for inter-mixer node communication, dynamic "self-forming" of a cascaded mixer node topology, and talker identification within the "self-formed" cascaded mixer node topology. For purposes of this disclosure, the term "self-form", "self-formed", or "self-forming" refers to the ability of distributed cascaded mixer nodes to engage in peer-to-peer communications to coordinate with one another, with only minimal input from a Focus server, in order to control formation of a per call mixing tree and to also control handling of mixer node load balancing and self-recovery from root node failure events.

As used herein, the terms "root node", "root", "roots", "conference root", "tree root node", "tree root" and "tree roots" are used interchangeably to indicate a cascaded mixer node at a highest hierarchical level of a plurality of cascaded mixer nodes arranged in a tree topology. The root node includes a cascaded mixer node having a 'My Role' value equal to 'Root' as discussed below. Likewise, as used herein, the terms "leaf node", "leaf", "leaves", "conference leaf", "tree leaf node", "tree leaf" and "tree leaves" are used interchangeably to indicate a cascaded mixer node at a lower hierarchical level than the root node, in a plurality of cascaded mixers nodes arranged in a tree topology. The conference leaf node includes a cascaded mixer node having a 'My Role' value equal to 'Leaf' as also discussed below.

A method for inter-mixer node signaling in a conferencing network includes, selecting a plurality of media flow payloads at a first cascaded mixer node. A set of conference payloads are generated that each include the media flow payloads from the plurality of media flow payloads that are part of the same conference call, an identifier for the conference call, and a node identifier for each media flow payload in the conference call. For each media flow payload in the conference call, each conference payload further identifies whether the first cascaded mixer node is a root node or a leaf node. The set of conference payloads are bundled into a single packet and sent to a second cascaded mixer node.

A method for self-forming a cascaded mixer node tree topology for a conference call is as follows. A cascaded mixer node accepts a request to connect a participant to the conference call. The participant is designated as a first participant to join the conference call at that cascaded mixer node. A state of the first cascaded mixer node is then determined/identified as either a root node or a leaf node for the conference call. The state of the first cascaded mixer node is communicated to other neighboring mixer nodes. A self-forming algorithm, as herein described, spreads the computational and communications load across the system while also converging in less than one second.

A talker identification method as disclosed herein includes receiving, at a Focus server, a root node report of talker identification events from a first cascaded mixer node. In one illustrative embodiment, the first cascaded mixer node is a root node for a conference call. The Focus server further receives a leaf node report of talker identification events from a second cascaded mixer node, where the second cascaded mixer node is a leaf node for the conference call. The root node report is correlated to the leaf node report, and an active talker identity for the conference call is resolved based on the established correlation.

The decoupled cascaded mixer node framework and related methods, as described in this disclosure, can be implemented in conjunction with established standards for audio/video conferencing including, but not limited to, those defined by the IETF and the $3^{rd}$ Generation Partnership Project (3GPP). Currently, the IETF and 3GPP are developing standards for Session Initiation Protocol (SIP)-based conferencing frameworks including a network of cascaded mixer nodes.

Other benefits of the embodiments of the present disclosure include optimized networking bandwidth consumption and use of a standard SIP dialog between a Focus server and the distributed cascaded mixer nodes. At least one illustrative embodiment of the present disclosure is designed to meet the needs of federal, public safety, military, and enterprise users. For example, some embodiments as herein described support dispersed sites with minimal WAN bandwidth consumption, support hundreds of participants in a single conference, and support fast failure recovery with no single point of failure. Another advantage of having the cascaded mixer nodes decoupled from a conferencing Focus server and conference policy server is that various embodiments of the present disclosure are readily implemented into some existing commercial conferencing systems. Those skilled in the art will realize that the above recognized advantages and other advantages described herein are merely illustrative and are not meant to be a complete rendering of all of the advantages of the various embodiments.

Referring now to the figures, FIG. 1 illustrates a system 100 having a decoupled cascaded mixer node architecture in accordance with some embodiments. The system 100, illustrates an overall framework comprising a network of cascaded mixer nodes (CMNs) 102, 104, 106, 108. Furthermore, the overall framework as depicted in FIG. 1 is herein referred to as a "conferencing network". However, this is a very general depiction. In various embodiments, the system 100 accommodates any number of CMNs deployed in a LAN/WAN Enterprise or IP Multimedia Subsystem (IMS) environment, as described in 3GPP Technical Specification (TS) 23.228 and any subsequent revisions. The internal structure of a general apparatus implementing a CMN is discussed in more detail with reference to FIG. 2 below.

In some illustrative embodiments, the CMNs 102, 104, 106, 108 are implemented by way of peripheral component interconnect (PCI) cards installed on individual computer systems, such as, among others, personal computers. For the embodiment shown in FIG. 1, the CMNs 102, 104, 106, 108 are interconnected in a "full-mesh" configuration such that each CMN is connected to every other CMN. Accordingly, the full-mesh configuration is based on a cascaded mixer node framing protocol (CMfP) that, in some embodiments, is operated over peer-to-peer user datagram protocol (UDP)/internet protocol (IP) connections as described in IETF RFC 768 dated August 1980 and any subsequent revisions, and as described in IETF RFC 791 dated September 1981 and any subsequent revisions. The CMfP is discussed further below, in particular with reference to FIGS. 3-6. In alternative embodiments, the CMNs 102, 104, 106, 108 are interconnected in other network configuration such as, among others, a bus, a star, a ring, a tree, a partial-mesh configuration or other configuration.

Each of the CMNs 102, 104, 106, 108 have a control protocol link to at least one conferencing Focus server 110, as indicated by a dashed/arrowhead line 111 in FIG. 1. The control protocol is based on standard Focus server-to-mixer node SIP messages, such as gateway control protocol H.248 in 3GPP, and fully supports the methods as disclosed herein.

The system 100 also includes a conference policy server 112 coupled to the Focus server 110. The Focus server 110 implements a conference policy stored on the conference policy server 112 to provide a set of rules governing a conference. In a 3GPP scheme, the Focus server 110 is termed/identified as a media resource function controller (MRFC), and the conference policy server 112 is termed/identified as a conferencing application server (AS).

The Focus server 110 also maintains a link to each participant 114 of a plurality of participants by a SIP dialog. In FIG. 1, each of the participants 114 is illustratively represented as a mobile device. However, a participant can also take the form of a PC application, a SIP hardphone, a public switched telephone network (PSTN) gateway, or another Focus server, among others. Furthermore, in at least one embodiment, a media stream (comprising media such as voice, data, video, text, etc. also referred to herein as "media flows") flows between a participant 114 and one of the CMNs 102, 104, 106, 108 using real-time transport protocol (RTP) as described in IETF RFC 3550 dated July 2003 and any subsequent revisions, as indicated by a dashed/arrowhead line 115.

This general framework, as shown in FIG. 1, is able to accommodate conferences with a large number of participants in a large grouping of simultaneous conference calls. In some embodiments, the framework of the system 100 is implemented in the context of IETF Request for Comments (RFC) 4353 dated February 2006, which defines a framework for conferencing with SIP. In other embodiments, the framework of the system 100 is implemented in the context of a 3GPP IMS framework. However, the teachings herein are generally applicable to any conferencing framework that uses a session control protocol.

Figure 2:
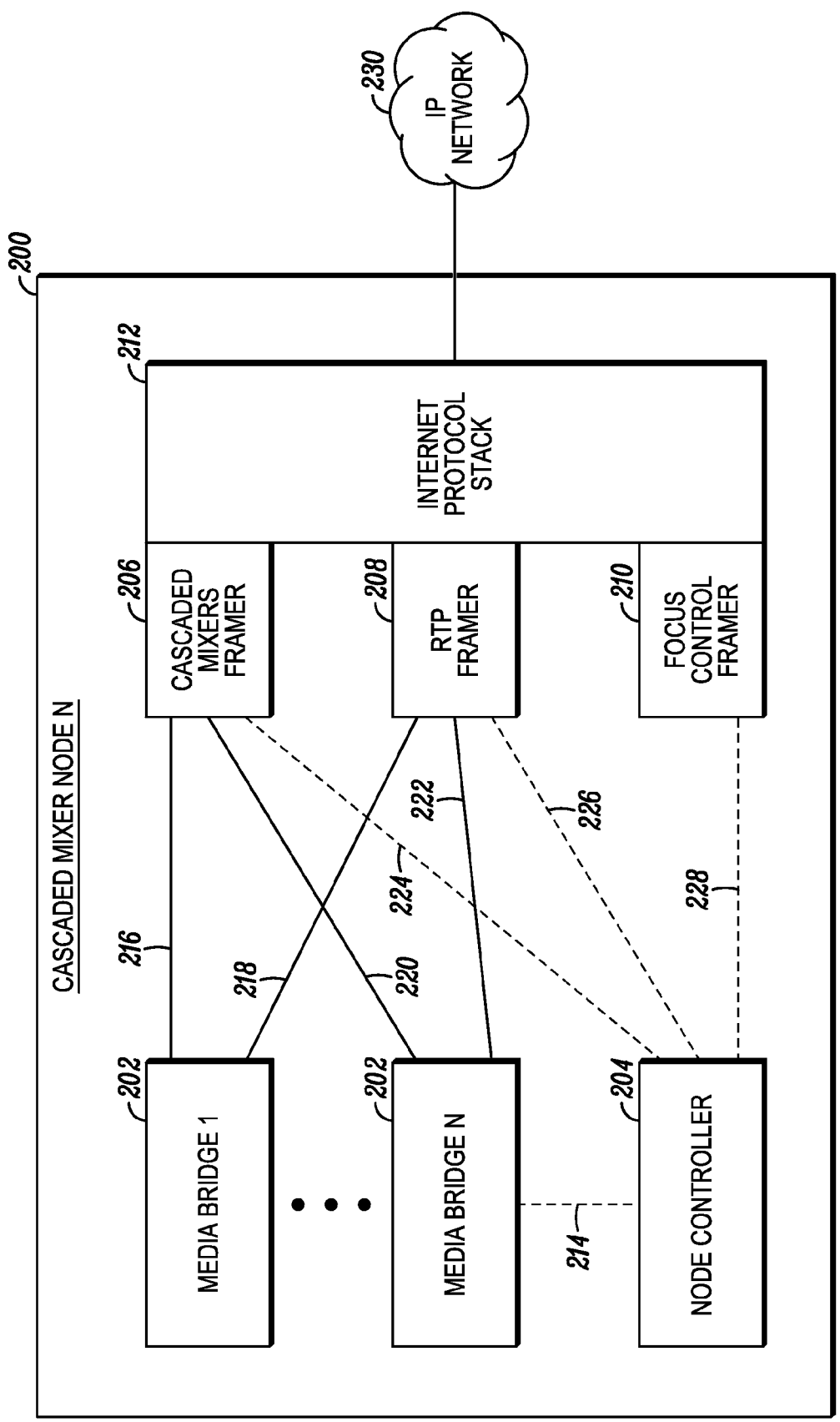
FIG. 2 illustrates a cascaded mixer node in accordance with some embodiments.

FIG. 2 illustrates a cascaded mixer node (CMN) 200 in accordance with at least one illustrative embodiment. In particular, FIG. 2 shows the internal structure of a general apparatus to implement the CMN 200 according to the various embodiments described herein. As shown, the CMN 200 comprises various functional blocks including, among others, a plurality of media bridges 202, a node controller 204, a cascaded mixers framer 206, an RTP framer 208, a Focus control framer 210, and an IP stack 212 for communication with an IP network 230. For purposes of this disclosure, each of the blocks that make up the CMN 200 is an independent aspect/feature of its actual implementation. In some embodiments, at least some of the functional blocks of the CMN 200 include an independent hardware device, a device that is part of a field-programmable gate array (FPGA), an application-specific integrated circuit (ASIC), and any combination thereof In other embodiments, at least some of the functional blocks of the CMN 200 include a software code executed on any general-purpose computer.

The node controller 204 controls all of the functional blocks of the CMN 200, and the node controller 204 provides an interface point between the Focus server 110 of FIG. 1 and the CMN 200. In some embodiments, the node controller 204 also stores preconfigured information and/or databases for the CMN 200 in a memory of a type such as, among others, non-volatile memory and/or volatile memory.

The media bridge 202 is a device or executable software code that is able to multiplex media flows together. For purposes of this disclosure, the multiplexing or "mixing" by the media bridge 202 is performed according to any suitable method. In some embodiments, the media bridge 202 can identify active media participants (i.e., "talkers"). In other embodiments, the media bridge 202 can support a variety of media formats such as, among others, G.729 communications standardized by the International Telecommunication Union (ITU) and a vocoder format based on the well known GSM (Global System for Mobile communications) standard for mobile phones. The node controller 204 controls the media bridges 202 over an internal control interface, as indicated by a dashed line 214.

In some embodiments, the node controller 204 "assigns" the media bridge 202, which means that the node controller 204 connects participants and remote media bridges. In other embodiments, the node controller 204 retrieves participant information. In yet other embodiments, the node controller 204 assigns a media bridge port. The media bridge 202 is also connected to the cascaded mixers framer 206 and to the RTP framer 208 by an internal media flow interface, denoted by a plurality of lines 216, 218, 220, and 222. For purposes of this disclosure, any suitable internal control and media flow protocol can be used for communication between and among the various functional blocks of the CMN 200.

The cascaded mixer node framer 206 handles multiplexed media flows between the media bridges 202 of the CMN 200 and media bridges of remote mixer nodes. The cascaded mixers framer 206 employs the cascaded mixer node framing protocol as discussed below. Exchange of preconfigured information and per-conference related information at the cascaded mixers framer 206 are each controlled by the node controller 204 over the internal control interface as indicated by a dashed line 224 in FIG. 2.

Media flow toward participants is handled by the RTP framer 208. As indicated by a dashed line 226 in FIG. 2, the node controller 204 operates the RTP framer 208 over the internal control interface. In some embodiments, the node controller 204 assigns an RTP port at the control interface. The Focus control framer 210 handles communications between the node controller 204 and the Focus server 110 as shown in FIG. 1. The node controller 204 controls the Focus control framer 210 over an internal control interface, indicated by a dashed line 228. In some embodiments, such as in an IETF-based system, the Focus control framer 210 can be a SIP framer/parser. In other embodiments, such as in a 3GPP-based system, the Focus control framer 210 can be an H.248 framer/parser.

Figure 3:
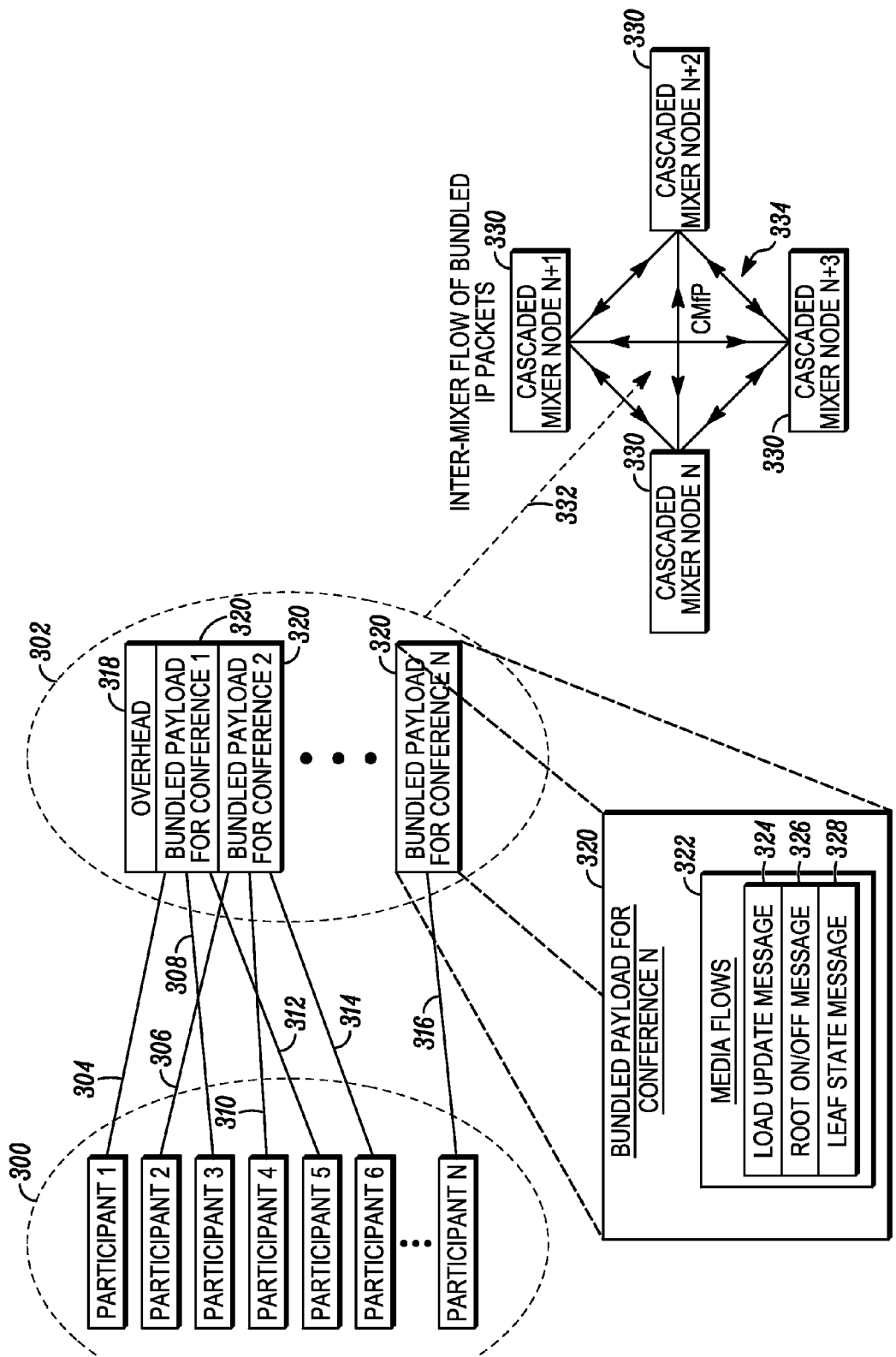
FIG. 3 illustrates a system and method for inter-mixer node media flow in accordance with some embodiments.

Generally, FIGS. 3-6 illustrate various embodiments of a media mixing algorithm and a related cascaded mixer node framing protocol (CMfP). Referring now to FIG. 3, a system and method for inter-mixer node media flow in accordance with some embodiments is described as follows. In general, cascaded mixer nodes perform multistage media mixing with minimum transcoding in a tree hierarchy. The mixing operation in a cascaded mixer node architecture depends on the conference participants' voice encoding type. For example, in some embodiments, the media mixing is a simple weighted summation of the voice signals if all conference participants use a high bit rate waveform encoding, such as, among others, encoding above 32 Kbps, for example G.711. For the more practical case of low bit rate voice encoding, such as, among others, encoding typically between 5 and 13 Kbps, for example G.729 or GSM-AMR, then the media mixing operation reduces to a selection of N-active speakers done at each hierarchical level of the cascaded mixer nodes. The multiplexing operation bundles the selected speakers' media flow payloads, such as encoded voice frames of the selected speakers, into one CMfP packet and sends the packet to the next hierarchical level. For the mixed case of both low bit rate and high bit rate voice encoded conference participants, the high bit rate voice encoded sources are initially transcoded into a low rate encoding and then processed as described above for the case of all low bit rate encoding.

As used herein, media streams or media flows sent from a conference participant to a mixer node comprise a plurality of individual units of media that in general are herein called "media flow payloads". In some instances, the terms media flow and media flow payload are used herein interchangeably. A "conference payload" comprises a plurality of bundled media payloads, as referenced herein. Accordingly, in operation, a conference payload is sent between two cascaded mixer nodes.

In some embodiments, an optimal speaker selection algorithm for a cascaded mixer node architecture is a hierarchical distributed speaker selection. The algorithm is based on two levels of speaker selection divided between a plurality of leaf nodes and a root node. Accordingly, each leaf node is responsible for selecting a first quantity of N participants from local participants relative to the leaf. Thus, from the algorithm, the first quantity of N participants represent a set of participants that have the highest potential for obtaining speaking privileges during a conference. Thereafter, the root node selects, from the first quantity of N participants, a second quantity of M participants that actually get speaking privileges during the conference. All nodes including leaf nodes and root nodes use the same speaker selection algorithm. However, the described embodiments do not rely on any specific speaker selection algorithm.

Bidirectional media flows between a tree root mixer node and a plurality of tree leaf mixer nodes facilitate multistage media mixing. However, these media flows represent added operational expenditures (OPEX) on WAN connectivity for the enterprise and carrier operating a cascaded mixer node based conferencing system. Thus, embodiments of the CMfP are designed to achieve lower WAN OPEX in a cascaded mixer node conferencing architecture and provide efficient signaling between mixer nodes to support the "self-forming" algorithm as herein described.

In particular, in some illustrative embodiments, the media flow payloads of different conferences are bundled together into a single IP packet instead of sending each media flow payload in a separate RTP packet when a cascaded mixer node system is loaded with active conferences. In other embodiments, the bundled media IP packets are sent every frame time interval, for example in 20 ms periods, between cascaded mixer nodes to serve as a fast and reliable signaling link between the mixer node controllers to enable a fast and reliable "self-forming" algorithm in the system. Additionally, the fact that the signal is repeated at every frame time interval allows for reliable majority-based decisions at the receiving end of the signal at a sub-100 ms timescale.

Returning to FIG. 3, a plurality of participants 300 engaging in various conferences, have their media streams bundled into a single IP packet 302 (for instance) per conference, as indicated by a plurality of lines 304, 306, 308, 310, 312, 314, 316. For example, the media streams 304, 308, and 312, respectively, from participants 1, 3, and 5 comprise the bundled payload for Conference 1; and the media streams 306, 310, and 314, respectively, from participants 2, 4, and 6 comprise the bundled payload for Conference 2. The IP packet 302 includes an overhead 318 (e.g., an IP header) and a plurality of bundled payloads 320, where each bundled payload of the plurality of bundled payloads 320 corresponds to one conference of a plurality of conferences in which the plurality of participants 300 are engaged. In some embodiments, a plurality of media flows 322 of the bundled payloads 320 includes a load update message 324, a root on/off message 326, and a leaf state message 328. After bundling of the media streams into the IP packet 302, the IP packet is transmitted between at least two mixer nodes of a plurality of cascaded mixer nodes 330 as indicated by a dashed arrow 332 over a full-mesh network 334.

FIG. 4 illustrates a bundled media packet 400 in accordance with at least one illustrative embodiment. In particular, the depicted bundled media packet 400 is sent between a tree-root node and a tree-leaf node for a single conference in which all participants are using low bit rate encoding. In the example of FIG. 4, there are two parallel, bidirectional media flows included in the bundled media packet 400 from selected conference participants. As shown in FIG. 4, the direction of the media flow is indicated by a D-bit for each media flow, which can have, for example, a value of "0" for a leaf node to root node flow and a value of "1" for root node to leaf node flow.

Moreover, each media flow represents one selected conference participant. In some embodiments having three or more media flows with respective selected conference participants, the additional media flow payloads along with their associated parameters are appended to the end of the bundled media packet 400. In other embodiments having media flows for a high bit rate conference in which all active participants are summed up in each node such that no user selection is applied, only one media flow per conference is sent between the mixer nodes.

Referring to a set of labeled parameter fields as shown in FIG. 4, the bundled media packet 400 comprises an overhead that includes IP+UDP headers, and a general overhead comprising a "Time Stamp" field, and a "Node Load" field. The "Time Stamp" field reflects a clock that increments monotonically and linearly in time to allow for synchronization and jitter calculations for all bundled frames. In one illustrative embodiment, the clock operates at 8 kHz for audio and at 90 kHz for video. The Node Load field includes a "node load" value, which is a measure of spent capacity of a mixer node in facilitating conference calls, and is explained in more detail with respect to the "self-forming" algorithm depicted in FIGS. 9-15 below.

A conference identification or "CID" field includes an identifier for the conference call. In one example implementation, the conference identifier is directly derived from a "Conference-URI" string of the conference using a hash function such as among others, MD5, CRC, etc. The CID field is also explained further below. The CID field, which in some embodiments is 14 bits in length, is sufficient for a cascaded mixer node conferencing system supporting 16,384 parallel conference calls. However, for optimum practical performance, no more than approximately 5000 conferences should be supported using a 14-bit CID field as discussed further below. In other embodiments, when a cascaded mixer node conferencing system supports a larger number of conferences, illustratively greater than about 5000, the CID field is extended to accommodate the increased number of conferences.

Still referring to the parameter fields of FIG. 4, an "NBP" field reflects a number of bundled payloads per CID. Moreover, in FIG. 4, a "PL" field represents a payload length and a "PT" field represents a payload type. The payload type identifies a format of the payload and determines its interpretation by an application. The PT field is copied from a source RTP header of a selected participant. A node identification or "NID" field includes an identification or ID of the node to which the selected participant is connected. As shown in FIG. 4, a 5-bit NID field accommodates a system having 32 nodes. However, the NID field extends to accommodate additional nodes. Where a conference comprises all participants using high bit rate encoding, the conference payload comprises a single combined media flow payload that includes a summation of two or more different media flow payloads. The NID for the different summed media flow payloads is a single NID.

A "UID" field includes a user identification for the selected participant. FIG. 4 illustratively shows 6-bits for the UID field and thus assumes 64 participants per conference per node. Further, a concatenation of the CID, NID, and UID fields uniquely identifies a participant in the cascaded mixer node conferencing system. In some embodiments of a high bit rate conferencing system in which no user selection is applied such that all active users are summed up in each node, the UID field is set to 0×3F. A "Sequence Number" field reflects the sequence number of the media payload, and one or more "R" fields represent reserved bits.

As shown in FIG. 4, each media flow representing a payload of the selected conference participant is preceded by unique parameters specifying its UID or User-ID, its NID or Node-ID, its payload type or vocoder type, and its payload length, among others. If two mixer nodes participate together in two or more conferences simultaneously where a node role, e.g. root node or leaf node, changes in each conference, then the combined information of all conferences is sent in one packet for each direction, for example root node-to-leaf node or leaf node-to-root node to reduce the header overhead, for example IP+UDP+general overhead.

Figure 6:
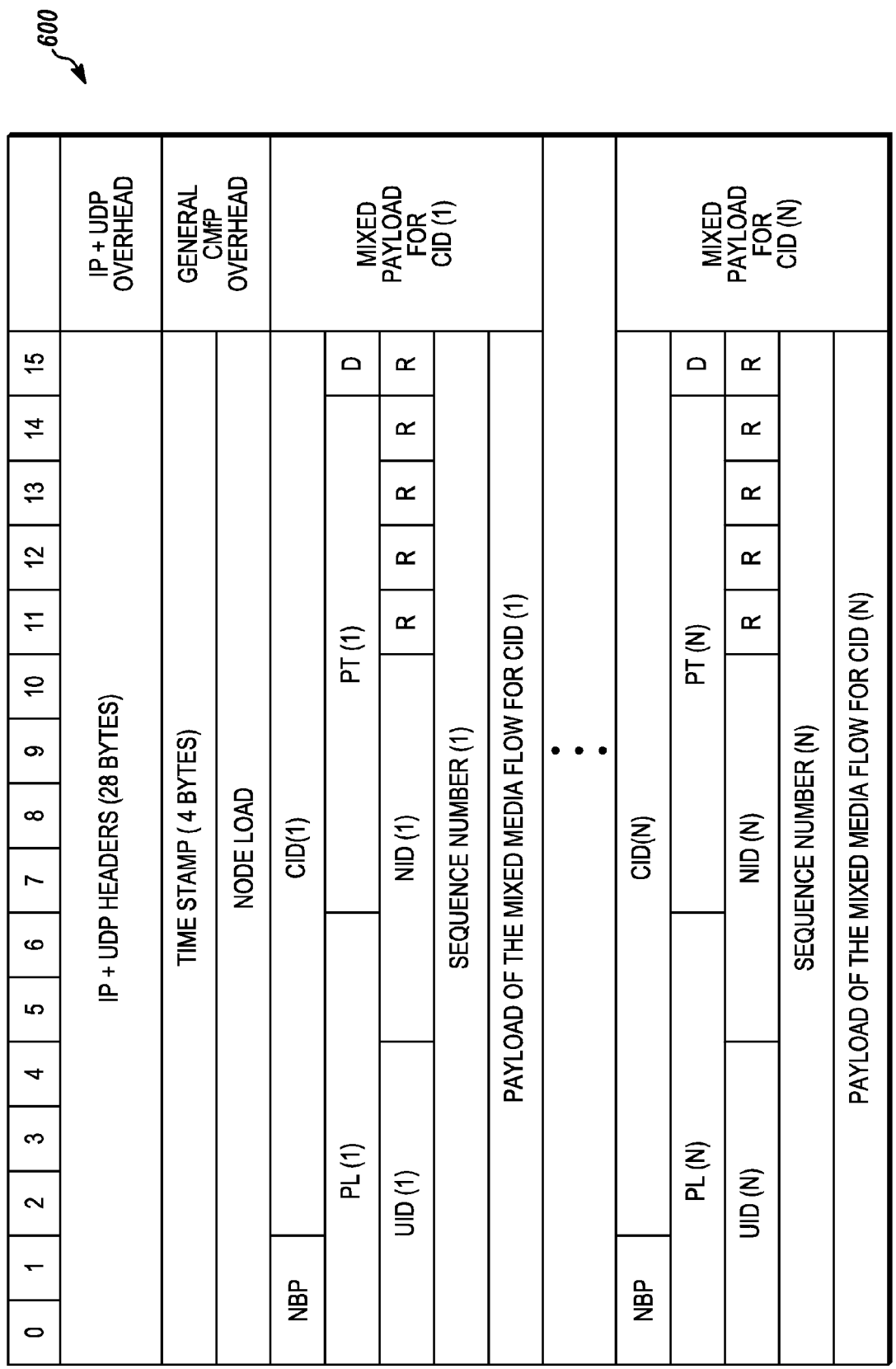
FIG. 6 illustrates a bundled media packet in accordance with yet other embodiments.

Illustratively, FIG. 5 shows a generalized structure of a bundled compressed packet 500 for sending all one-way traffic between two nodes participating in a quantity of N-conferences. As another example, FIG. 6 shows a generalized structure of a bundled compressed packet 600 for sending mixed media flows between a quantity of N-high bit rate conferences.

Figure 7:
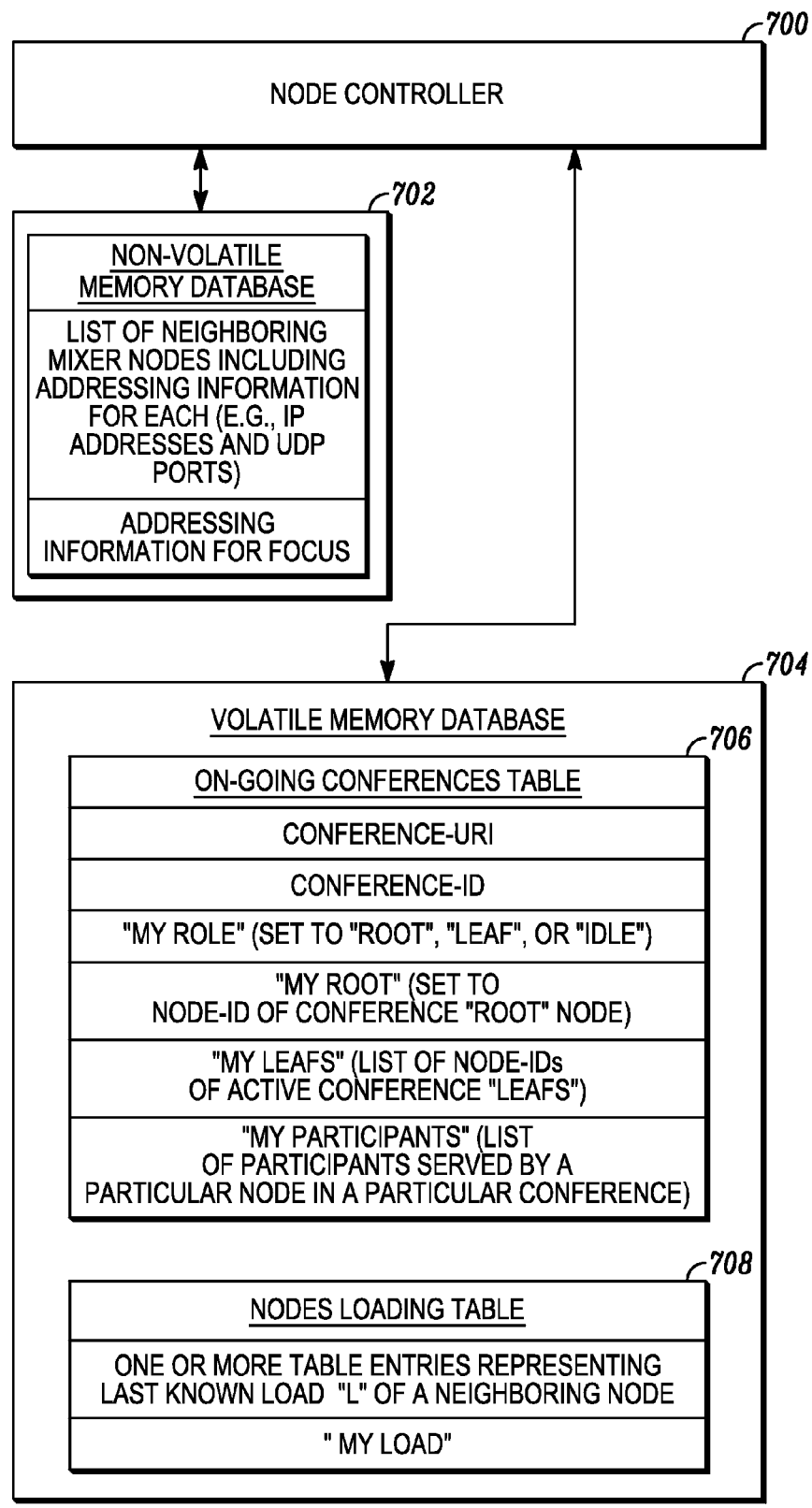
FIG. 7 illustrates a node controller interface to various memory modules in accordance with some embodiments.

FIG. 7 illustrates a node controller 700 included in a cascaded mixer node (not shown) interfacing a non-volatile memory 702 and a volatile memory 704 in accordance with various embodiments. For purposes of the "self-forming" cascaded mixer node algorithm, each mixer node controller in one illustrative embodiment stores the following preconfigured information in the non-volatile memory 702: (1) A list of neighboring cascaded mixer nodes in the system and addressing information that leads to them that include, in this example, an IP address and UDP port for CMfP of each neighbor; and (2) addressing information for the system Focus server such as an IP address. Additionally in this illustrative embodiment, for purposes of the "self-forming" cascaded mixer node algorithm, each mixer node controller stores the following information in the volatile memory 704: (1) An on-going conferences table 706 with, at a minimum, data for each conference in which the corresponding cascaded mixers node is serving, with the data in the conferences table 706 including: a Conference-URI as received from the Focus server, a Conference-ID (e.g., the hash value of the Conference-URI); a 'My Role' value (either 'Root' or 'Leaf' or 'IDLE'), a 'My Root' value (the Node-ID of the 'root' node of the conference), a 'My leafs' value (a list of Node-IDs of active leaves in the conference), and a 'My Participants' value including a list of participants served by this node in this conference, where each participant is represented by its RTP/IP information and a local UID; and (2) a nodes loading table 708 including a last known reported load ("L") of one or more neighboring nodes in the system, and a 'My Load' value representing a load of the cascaded mixer node corresponding to the node controller 700.

Figure 8:
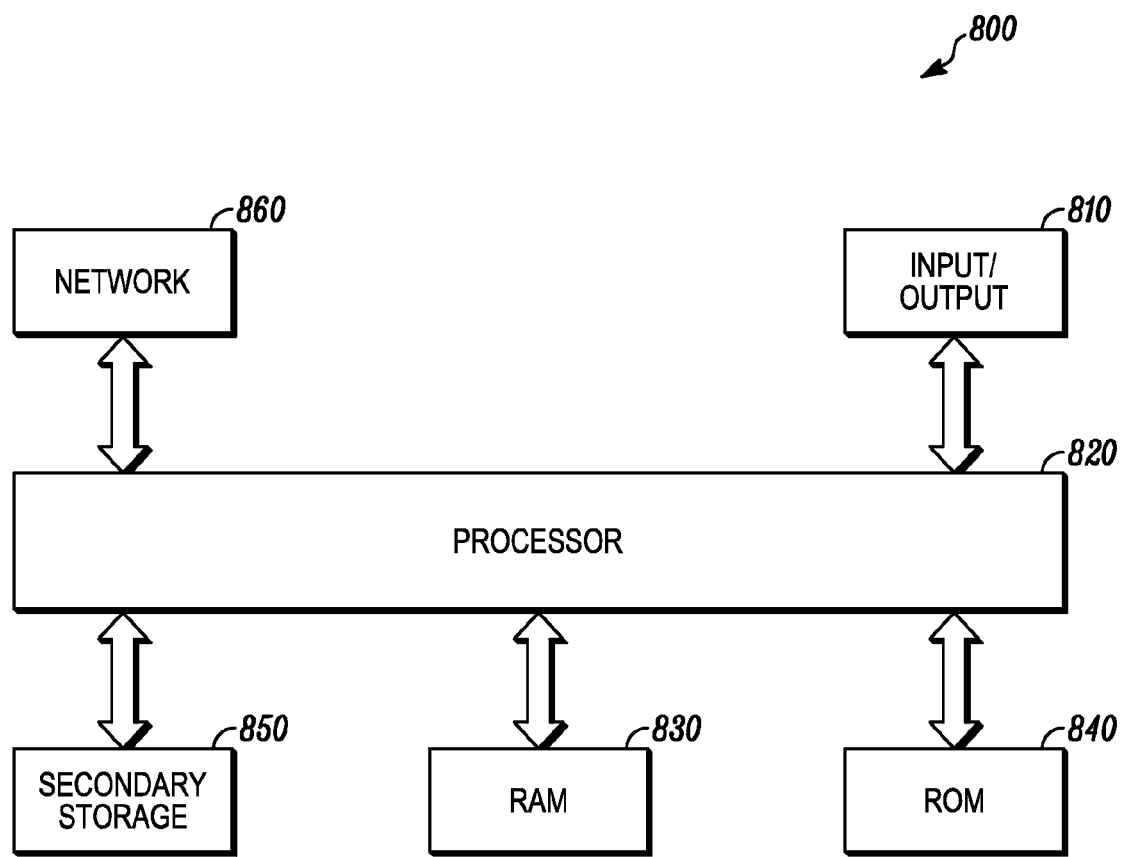
FIG. 8 illustrates a general purpose computer system suitable for implementing various embodiments.

FIG. 8 illustrates a general-purpose computer system 800 suitable for implementing one or more embodiments already described, including portions of the cascaded mixer node architecture and related methods, and in particular the methods shown and described with reference to FIGS. 9-17 below. The computer system 800 comprises a processor 820, which is often referred to as a central processor unit or CPU, that is in communication with memory devices including a secondary storage 850, a read only memory (ROM) 840, a random access memory (RAM) 830, a plurality of input/output (I/O) devices 810, and a plurality of network connectivity devices 860. The processor can be implemented as one or more CPU chips.

The secondary storage 850 comprises one or more disk drives or tape drives. The secondary storage 850 is used for non-volatile storage of data and as an overflow data storage device if the RAM 830 is not large enough to hold all working data. The secondary storage 850 can be used to store programs that are loaded into the RAM 830 when selected for execution. The ROM 840 is used to store instructions and perhaps data, which are read during program execution. The ROM 840 is a non-volatile memory device that often has a small memory capacity relative to the larger memory capacity of secondary storage. The RAM 830 is used to store volatile data and optionally to store instructions. Access to both the ROM 840 and the RAM 830 is often faster than accessing the secondary storage 850.

Illustratively, the plurality of I/O devices 810 include printers, video monitors, liquid crystal displays (LCDs), touch screen displays, keyboards, keypads, switches, dials, mice, track balls, voice recognizers, card readers, paper tape readers, or other well-known input devices. The plurality of network connectivity devices 860 can comprise, among others, modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices.

In this particular illustrative embodiment, the plurality of network connectivity devices 860 include PCI cards used to implement a cascaded mixer node, as discussed with reference to FIGS. 1 and 2 above. These plurality of network connectivity devices 860, for instance, enable the processor 820 to communicate with a global information system or one or more intranets. With such a network connection, it is contemplated that the processor 820 receives information from the network or outputs information to the network in the course of performing the above-described functionality. The information is received by the processor 820 and provided to the network in a variety of formats such as, among others, a computer data baseband signal and a signal embodied in a carrier wave. In one illustrative embodiment, the information comprises data and instructions for execution by the processor 820.

In one illustrative implementation, the baseband signal or signal embodied in the carrier wave generated by the plurality of network connectivity 860 devices propagates in or on the surface of electrical conductors, in coaxial cables, in waveguides, in optical media such as optical fiber, or in the air or free space. In another illustrative implementation, the information contained in the baseband signal or signal embedded in the carrier wave is arranged in accordance with different sequences that are desired for processing, generating the information, transmitting, and receiving the information. The baseband signal or signal embedded in the carrier wave, or other types of signals currently used or hereafter developed, referred to herein as the transmission medium, are readily generated according to several methods well known to one skilled in the art. The processor 820 executes instructions, codes, computer programs, scripts which it accesses from the ROM 840, the RAM 830, the plurality of network connectivity devices 860 or from a hard disk, a floppy disk, and/or an optical disk, where various disk-based systems are considered as the secondary storage 850.

FIGS. 9-15 illustrate various embodiments of a "self-forming" algorithm, which refers to the ability of the distributed cascaded mixer node of a cascaded mixer node conferencing system to communicate and coordinate with one another, with only minimal input from a Focus server, to form a per call mixing tree while also handling mixer node load balancing and self-recovery from root node failure events. Using this approach, it is possible to decouple the cascaded mixer node management from the Focus server, thus allowing the cascaded mixer nodes to operate with any standardized Focus server designed for a centralized mixer node environment. This "self-forming" approach also improves the overall system services survivability and recovery. The "self-forming" algorithm supports the following procedures among scattered cascaded mixer nodes: (1) per-call tree root assignment, (2) per-call tree leaf joining, (3) per-call tree root failure recovery, and (4) overall nodes load balancing.

The distributed "self-forming" algorithm as described herein assumes that the Focus server is aware of the existence of the scattered cascaded mixer nodes, and that the Focus server uses some kind of procedure to distribute the participants' calls among the different mixer nodes. Illustratively, the Focus server uses a round-robin procedure to assign a participant call to a mixer node or the Focus server can direct a participant to use the 'closest' mixer node, etc.

It is also assumed that the Conferencing Policy Server, when setting a Conference-URI to a conference call Focus server, is aware of the hash function used by the mixer nodes to transform the Conference URI string into a CID value used as part of the CMfP protocol and prevents a CID conflict, such as duplication, in the system. Illustratively, the Conference policy server would regenerate Conference URI strings until it got a CID value that has not already been used.

A load-balancing algorithm distributes a mixing computational load and communications load among the various mixing nodes. For this purpose a node load parameter "L" is defined, where L=w1*(number of overall participants currently connected to the node)+w2*(number of tree-roots currently running on the node)+w3*(number of leaves currently running on the node)+w4*(# of voice transcoders currently running on the node)+w5*(number of video transcoders currently running on the node). In this equation, w1-w5 are constant weighting scalars that reflect the relative load created by each load factor. In a cascaded mixer node system of N mixer nodes, the load of the j-th mixer node is marked as $L_j$, $j=1 \ldots N$; and the "self-forming" algorithm assigns per call tree-roots in an attempt to minimize the load over the most loaded node using a min-max criteria: $Min(Max(L_j))$.

As described herein, the "self-forming" algorithm only calls for minimal interaction between the Focus server and the cascaded mixer nodes. Specifically, the "self-forming" algorithm need only support the basic operations of the Focus server, such as connecting or removing a participant with respect to a mixer node for a given conference, and does not require support from the Focus server to form conferencing trees and select root and leaf nodes for each tree. Nor does the "self-forming" algorithm require the Focus server for node load balancing or tree and root node failure recovery.

To accomplish these minimal functions: (1) the Focus server sends to a mixer node a "Connect (or Remove) a participant to (from) a conference" message which includes two parameters, the Conference URI (such as, among others, in accordance with IETF and 3GPP protocols) and the participant's media parameters (such as, among others, RTP payload type, RTP port, IP address); and (2) the mixer node replies with 'accept' or 'deny', and in case of 'accept' also provides local RTP port and IP address information that would serve the participant during the conference. Steps (1) and (2) above can be implemented either using a standardized SIP INVITE dialog between the mixer node's node controller and the Focus server in accordance with the IETF conferencing framework or can be implemented using H.248 in accordance with the 3GPP conferencing framework. Note that in case the mixer node in step (2) replies with a 'deny', the Focus server chooses another arbitrary mixer node and repeats step (1) with the other mixer node.

For purposes of the "self-forming" cascaded mixer node algorithm, it is assumed that the distributed node controllers can exchange the following three signaling messages reliably and in "real-time" with negligible latency: (1) a load update message (1:M), which is a periodic message (e.g., every 2 seconds) sent by a node controller to all other nodes in the system, containing a sender's current computed load "L"; (2) a root On (Off) message (1:M), which is a message sent by a node controller to all other nodes in the system, informing them that the sender either assumes or relinquishes a 'root' role in a particular conference in the system; and (3) a leaf state message (1:1), which is a message sent by a node controller acting as a leaf in a particular conference in the system to another node in the system, acting as the root node for that particular conference, reporting the leaf state of the sender such as, among others, 'IDLE' or 'ACTIVE'.

The messaging protocol implementation that carries the Load update message, the Root On (Off) message, and the Leaf state message can be any suitable and compatible messaging protocol. For example, in one embodiment, the CMfP protocol, as described above, embeds these three messages as a part of the media flows between the mixer nodes to achieve efficient and reliable signaling links with a time granularity of about 100 ms.

The various embodiments of the "self-forming" algorithm as described herein are based on the following ideas: (1) each node decides only on its own role and announces it to its neighbors; (2) conflicts over a root role rarely occur, but are quickly resolved by the embedded tree topology "self-forming" mechanism; (3) tree root failure detection and handling mechanisms are embedded in the "self-forming" tree topology algorithm; and (4) throughout the conference lifetime, the "self-forming" tree topology mechanism guarantees a "good enough" (but not necessarily optimal) topology. Specifically the "self-forming" algorithm is based on the following rules: (1) a conference root node is established at the mixer node level when the first participant joins the conference; (2) the conference root node periodically announces its root role to all neighboring nodes; (3) a conference leaf node is established when the first participant joins a node while the root node has already been announced; (4) a conference leaf node is terminated when the last participant connected to it is disconnected; and (5) the conference is terminated at the mixer node level when the last participant is disconnected from the conference, or if the conference is silent for a given timeout period. Moreover, the following inter-mixer node conditions, among others, dynamically change the conference tree topology: (1) a root conflict; (2) a root node disappearance; (3) a root node overload; (4) a conference leaf reconnect to a new conference after root transition; and (5) a leaf transition to a root node.

A root conflict is a condition wherein there are two or more concurrent roots to a conference. This condition occurs, for instance, during conference setup when the Focus server connects participants either one after the other, or upon a root overload or root failure condition as described below. More particularly at setup, two or more mixer nodes may open a conference root node each believing that it is the first mixer node to join the conference. If a conference root node receives a conflicting root announcement on a conference, it compares its load to the conflicting node load. The root node that resides in the mixer node with the lowest load remains as a root node, while the others switch to leaf nodes in the conference. If it identifies a root conflict, a leaf node stays with the old root until the roots resolve the conflict. The leaf accepts the new root when the leaf detects that the old root has relinquished its role.

Regarding the root node disappearance, in case a conference leaf node identifies a disappearance of the root node, the leaf node takes over. In such a case, it is likely that more than one leaf node tries to take over for the absent root node. Any arising conflicts are detected and resolved in the next root update cycle. Regarding an overloaded root node, when a lesser loaded leaf identifies an overloaded neighboring node, the lesser loaded leaf attempts to take over the root node role in one of the conferences of its overloaded neighbor. Whether a node is deemed as "overloaded" or is in an "overload" state is based on comparing the node load to a threshold. This threshold is determined, for instance, based on experimentation to provide an acceptable performance level within the conferencing network.

Furthermore, with regard to the conference leaf reconnect upon a new root announcement, all conference leaf nodes acknowledge that they have accepted the transition through the conference leaf update to the new conference root node. The new conference root connects each of the leaf nodes to the conference only after the leaf update. Regarding the leaf transition to a root node, as explained above, the least loaded leaf transitions to a root node role in a conference in either of the following two conditions: a root disappearance or a neighbor overload. It should be noted that if two or more nodes have the same load, the node with the least NID takes over as the conference root.

Figure 9:
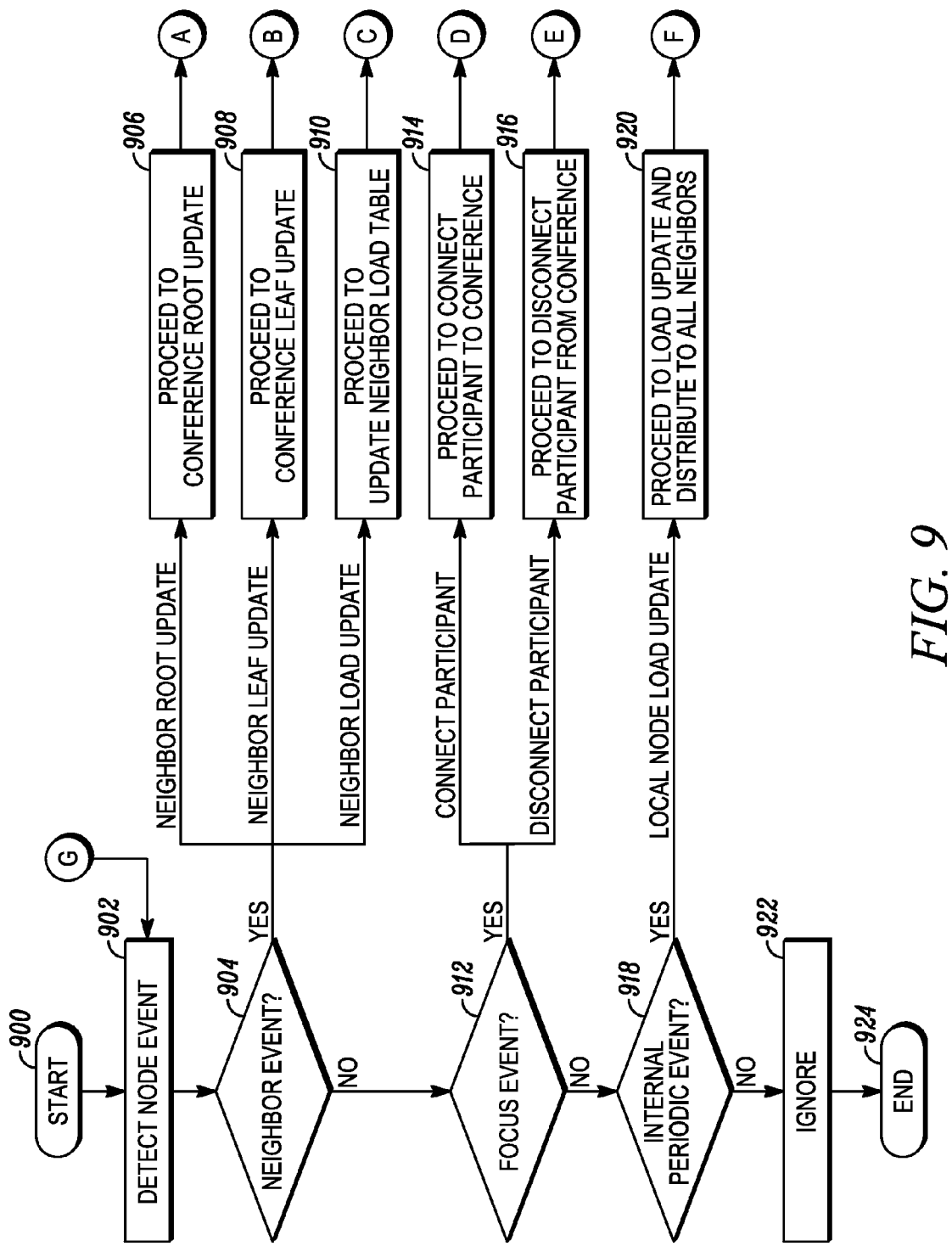
FIG. 9 is a logical flowchart illustrating a method for dispatching events at a node controller in accordance with some embodiments.

The above rules and conditions for implementing the "self-forming" cascaded mixer node algorithm are illustrated in FIGS. 9-15. In particular, FIG. 9 illustrates a logical flowchart showing an illustrative method for dispatching events at a node controller in accordance with some embodiments. Accordingly, the method starts (block 900) and proceeds to detecting a node event (block 902). In some embodiments, the node event is detected by a cascaded mixers framers, and includes, among others, events in a neighboring mixer node, Focus server events, and internal node events.

The method then proceeds to determining if the detected event is a neighbor event (block 904). If so, the method follows one of three paths depending on whether the neighbor event is a root update event (e.g., receipt of a root ON/OFF message), a leaf update event (e.g., receipt of a leaf update message), or a load update event (e.g., receipt of a load update message). In some embodiments, the node controller determines that the neighbor event is a neighbor root update event, and the method continues to a conference root update process (block 906), where the conference root update process is described below with respect to FIG. 10 (through a connector A). In other embodiments, the node controller determines that the neighbor event is a neighbor leaf update event, and the method continues to a conference leaf update process (block 908), where the conference leaf update process is described below with respect to FIG. 11 (through a connector B). In yet other embodiments, the node controller determines that the neighbor event is a neighbor load update event, and the method continues to a neighbor node load update process (block 910), where the neighbor node load update process is described below with respect to FIG. 12 (through a connector C).

If the detected event (block 902) is not a neighbor event (block 904), then the method proceeds to determining if the detected event is a Focus server event (block 912). If so, the method as shown in FIG. 9 follows one of two paths depending on whether the Focus server event is a request to connect a participant to a conference (a connect request) or a request to disconnect a participant from a conference (a disconnect request). In embodiments where the Focus server event is a connect request from the Focus server, the process continues to connect a participant to the conference (block 914), where the connect participant process is described below with respect to FIG. 13 (through a connector D). In other embodiments where the Focus server event is a disconnect request from the Focus server, the process continues to disconnect a participant from the conference (block 916), where the disconnect participant process is described below with respect to FIG. 14 (through a connector E).

If the detected event (block 902) is neither a neighbor event (block 904) nor a Focus server event (block 912), then the method proceeds to determining if the detected event is an internal event (block 918). If the detected event is an internal event, then the process advances to a local node load update process (block 920), where the local node load update process is described below with respect to FIG. 15 (through a connector F). According to various embodiments of the present disclosure, if the detected event (block 902) is not a neighbor event (block 904), a Focus server event (block 912), or an internal event (block 918), then the process ignores the event (block 922) and the method thus ends (block 924). Illustratively, the method repeats in a periodic manner.

Figure 10:
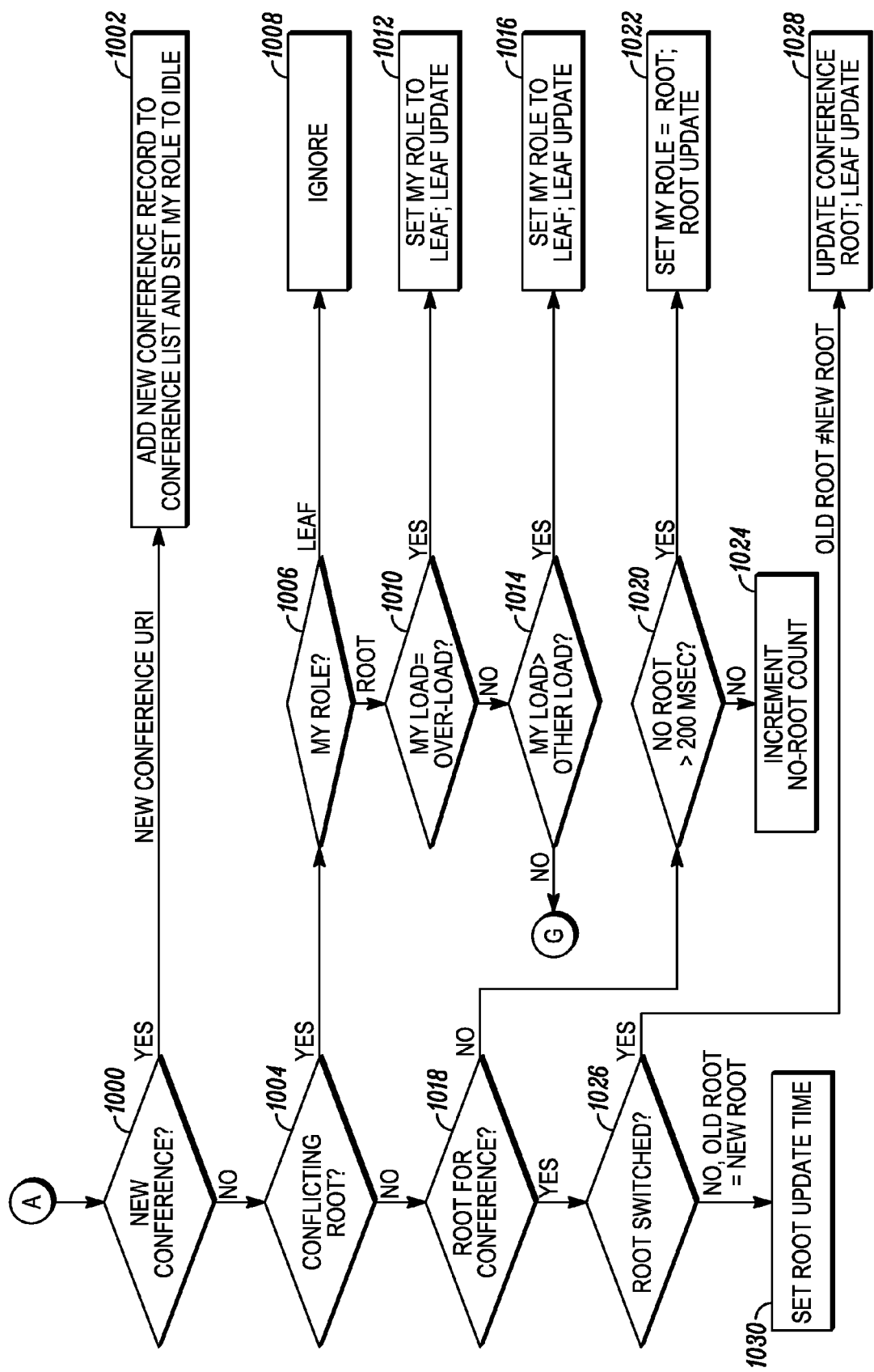
FIG. 10 is a logical flowchart illustrating a method for handling a root update in accordance with some embodiments.

As discussed above with reference to FIG. 7, each node controller stores information in a memory for the purpose of carrying-out the "self-forming" algorithm as described in further detail below. In particular, and in relevant part, each node controller stores an on-going conferences table including a 'My Role' value and a nodes loading table including a 'My Load' value. FIG. 10 illustrates a logical flowchart showing an illustrative method for handling a root update in accordance with some embodiments. In particular, FIG. 10 depicts a node controller's activity upon a root update event. According to the root update event, the node learns of new conferences in the cascaded mixer node system and of any conflicting root nodes to respond thereto.

From FIG. 9, the node controller has determined that the neighbor event is a neighbor root update event, with the method continuing to the conference root update process (block 906). Continuing in FIG. 10, as indicated by the connector A, the method advances to determine if a root update event is the result of a new conference (block 1000). If so, a new CID is generated such that the new CID is the hash value of a Conference URI received from the Focus server. A new conference record is added to a conference list and a 'My Role' value for the node controller is set to IDLE (block 1002).

If the root update event is not the result of a new conference (block 1000), the method then determines whether the root update event is the result of a conflicting root node (block 1004). If there is a conflicting root node, the node controller proceeds to determine its role and compares its load to that of the conflicting root node. If the node controller determines (block 1006) that its role is that of a leaf node, then the conflicting root is ignored (block 1008). However, if the node controller determines (block 1006) that its role is that of a root node and indicates an overloaded node status (block 1010) (e.g., 'My Load'=overload), then the node controller sets its role from a root node to a leaf node (e.g., 'My Role'=Leaf) and updates a list of conference leaves (block 1012). If the node controller determines that it is not an overloaded node (block 1010), and its load (e.g., 'My Load') is greater than the load of a neighboring node (block 1014), then the node controller sets its role to a leaf node (e.g., 'My Role'=Leaf) and updates the list of conference leaves (block 1016). If the node controller determines that its load is less than that of the conflicting root node, it returns to waiting for the next node event (FIG. 9, block 902) as indicated by the connector G.

If the root update event is neither the result of a new conference (block 1000) nor the result of a conflicting root node (block 1004), then the process advances to determine if a conference root has already been assigned (block 1018). If, in one illustrative embodiment, the node controller determines that there is no root node for greater than about 200 milliseconds (block 1020), then the node controller sets its role to the root node (e.g., 'My Role'=Root) and updates the conference root (block 1022). Alternatively, if the node controller determines that there is no root node for less than about 200 milliseconds (block 1020), then a no-Root count is incremented (block 1024).

For the following conditions where the root update event is not the result of a new conference (block 1000) nor a conflicting root node (block 1004), and a conference root node has already been assigned (block 1018), the method advances to determine whether the conference root node has been switched (block 1026). If an old conference root node is not equal to a new conference root node, then the conference root is updated, and the list of conferences leaves is updated (block 1028). However, if the old conference node is equal to the new conference node (block 1026), then a root update time is set (block 1030).

Figure 11:
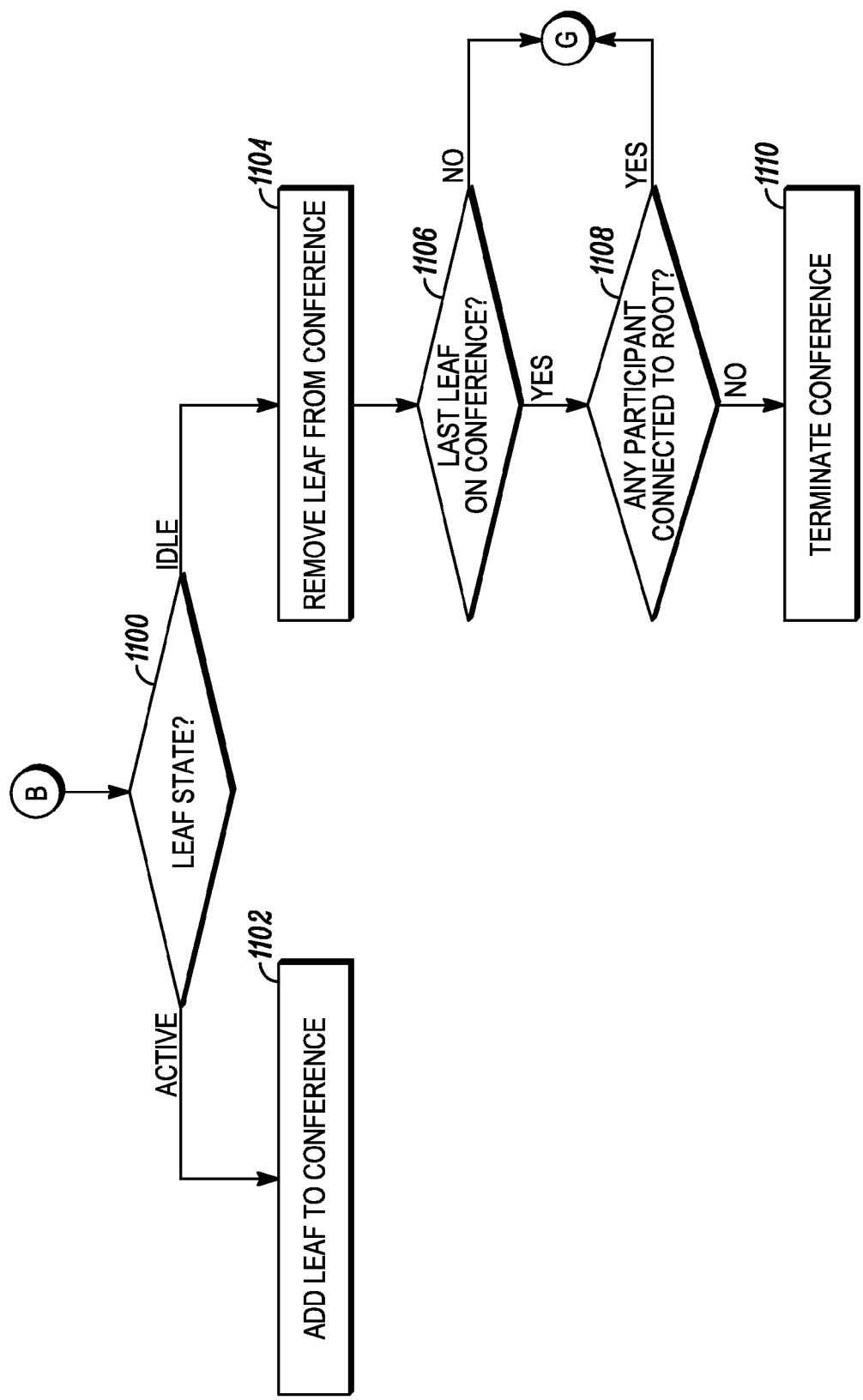
FIG. 11 is a logical flowchart illustrating a method for handling a leaf update in accordance with some embodiments.

FIG. 11 illustrates a logical flowchart showing an illustrative method for handling a leaf update in accordance with some embodiments. In particular, FIG. 11 depicts the flow of root node activity when receiving a leaf state update message. Recall that from FIG. 9, the node controller has determined that the neighbor event is a neighbor leaf update event with the method advancing to the conference leaf update process (block 908). Thus, continuing in FIG. 11 as indicated by the connector B, the method advances to determine the leaf state of the neighboring leaf that is the source of the neighbor leaf update event (block 1100). If the root node determines that the leaf state is 'ACTIVE', the neighboring leaf is added to the conference (block 1102). However, if the root node determines that the leaf state is 'IDLE', the neighboring leaf is removed from the conference (block 1104).

The root node then determines if the removed leaf was a last leaf on the conference (block 1106). If it was not the last leaf on the conference, the process advances to a connector G that indicates returning to the node controller events dispatcher (i.e., the connector G in FIG. 9) to wait for the next node event. If the root node determines that the removed leaf was the last leaf on the conference (block 1106), the process advances to identify if there are any remaining participants connected to the root node (block 1108). If there are still participants connected to the root node, the method proceeds to wait for the next node event (i.e., as indicated through the connector G). However, if it is determined that there are no more participants connected to the root node (block 1108), then the conference is terminated (block 1110).

Figure 12:
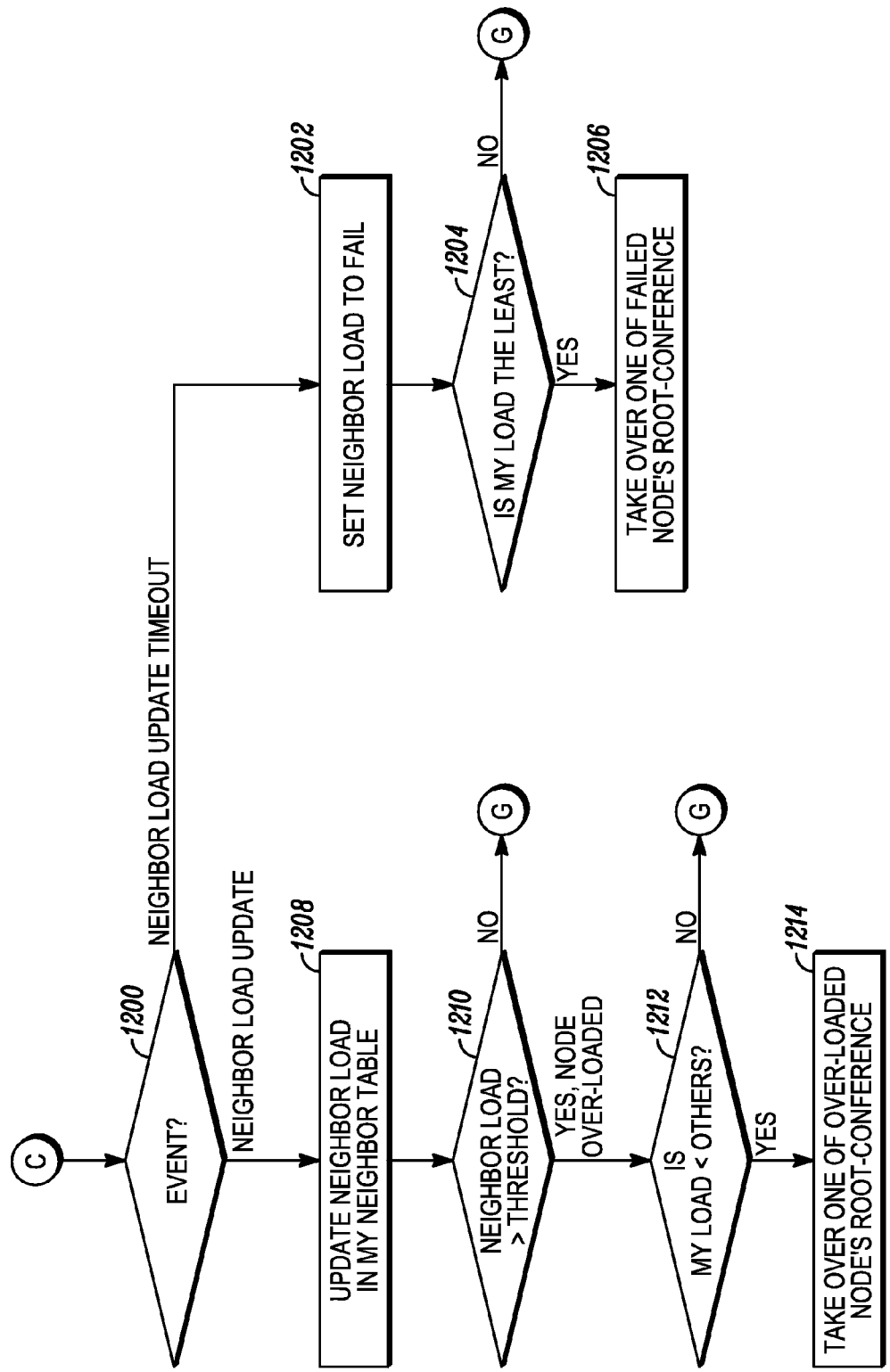
FIG. 12 is a logical flowchart illustrating a method for an inter-mesh node load update in accordance with some embodiments.

Referring now to FIG. 12, a logical flowchart showing an illustrative method for an inter-mesh or neighbor node load update is detected. Recall that from FIG. 9, the node controller has determined that the neighbor event is a neighbor load update event, with the method continuing to the neighbor node load update process (block 910). Thus continuing in FIG. 12, as indicated by the connector C, the method advances to determine the neighbor load update event type (block 1200).

If the node controller determines the event type to be a neighbor load update timeout event, then the process advances to set the neighbor load node to a Fail state (block 1202), and queries the node controller to determine if its load (e.g., 'My Load') is the least among neighboring nodes (block 1204). If it is not the least, then the method proceeds to wait for the next node event as indicated through the connector G. If the node controller determines that its load is the least (block 1204), then the node controller takes over one conference of the failed node's root (block 1206).

If the node controller determines the event type to be a neighbor load update event, then the process advances to update the neighbor load in the nodes loading table of the node controller (block 1208). Thereafter, the node controller determines if the neighbor load is greater than a threshold load (block 1210). If not, then the process proceeds to wait for the next node event as indicated through the connector G. If the node controller determines that the neighbor load is greater than a threshold load (block 1210) (i.e., the neighbor node is overloaded), the node controller then determines if its load is less than the neighbors' loads (block 1212). If not, then the method proceeds to wait for the next node event as indicated through the connector G. If the node controller determines that its load is less than the neighbors' loads (block 1212), then the node controller takes over one conference of the overloaded node's root (block 1214).

Figure 13:
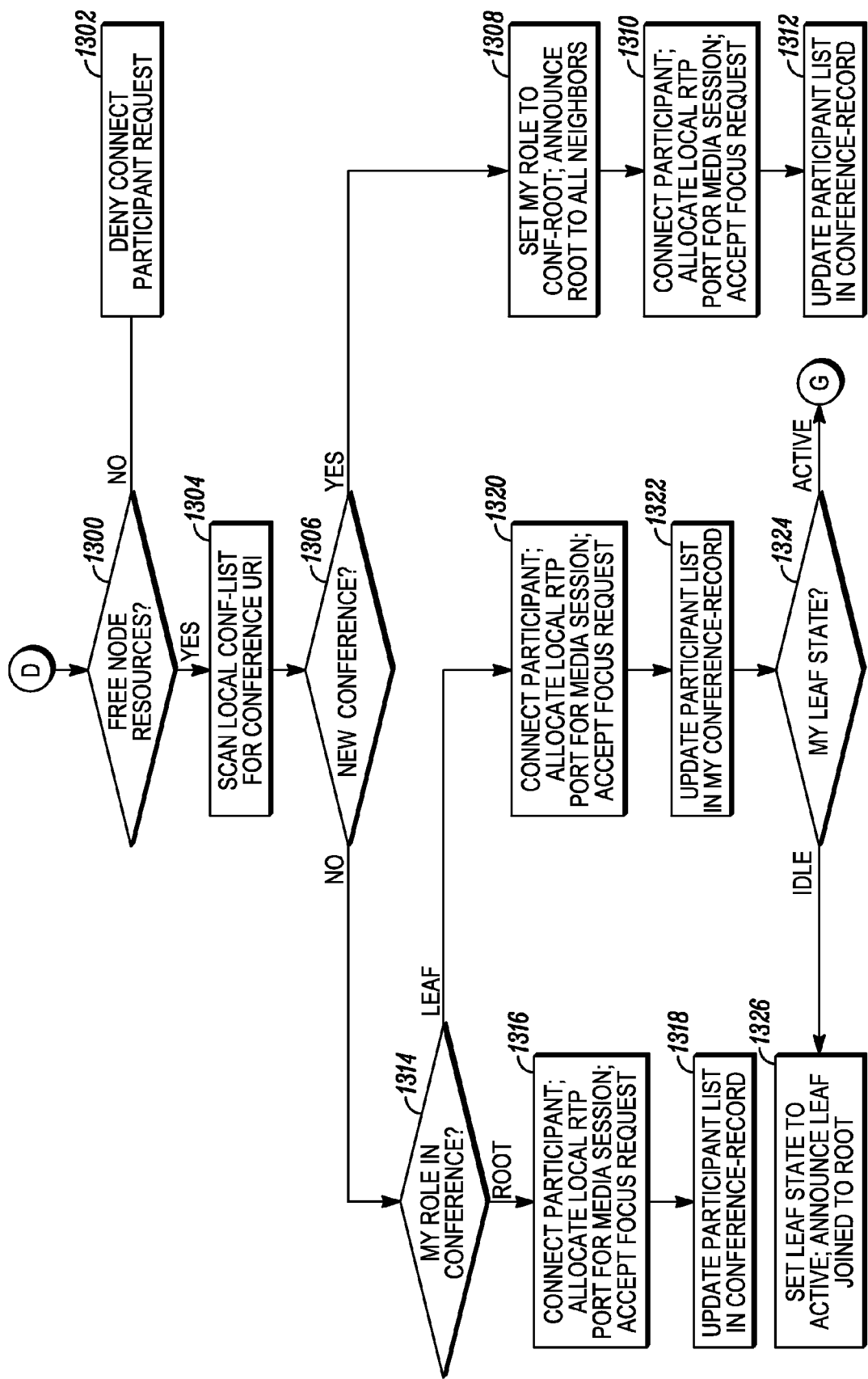
FIG. 13 is a logical flowchart illustrating a method for handling an add request in accordance with some embodiments.

FIG. 13 illustrates a logical flowchart showing an illustrative method for handling a connect request in accordance with some embodiments. In particular, FIG. 13 depicts the flow of the node controller's activity upon a new connect participant request from the Focus server. From FIG. 9, the node controller has determined that the Focus server event is a request to connect a participant with the method advancing to connect a participant to the conference (block 914). Continuing in FIG. 13, as indicated by the connector D, the method advances to determine if there are free node resources (block 1300). If not, the request to add a participant from the Focus server is denied (block 1302).

If it is determined that there are free node resources (block 1300), then the method advances to scan the local conference list for a Conference URI (block 1304). The hash value of the Conference URI is used to determine a CID. Afterwards, the method determines whether the selected conference from the scan of block 1304 is a new conference, and the participant, thereby, a first participant to the conference, (block 1306). If the selected conference is a new conference, the current node sets its role (e.g., 'My Role') equal to 'Root' and announces its role as root node to all neighboring nodes (block 1308). The participant is then connected to the conference, where connecting the participant to the conference includes, for example, allocating a local RTP port for a media session and accepting the Focus server request (block 1310). A participant list (e.g., 'My Participants') is updated in the conference record of the on-going conferences table (block 1312).

However, if the method determines that the selected conference from the scan of block 1304 is not a new conference (block 1306), then the current node first identifies its role in the conference (block 1314). If the current node is determined to be a root node, then the participant is connected to the conference. In one illustrative embodiment connecting the participant to the conference includes allocating a local RTP port for a media session and accepting the Focus server request (block 1316). Thereafter, the participant list is updated in the conference record (block 1318).

If the current node determines itself to be a leaf node at block 1314, then the participant is connected to the conference (block 1320). In one illustrative embodiment, connecting the participant to the conference includes allocating a local RTP port for a media session and accepting the Focus server request. The participant list (e.g., 'My Participants') in the conference record is then updated (block 1322).

The method then advances to identify the leaf state of the current leaf node (block 1324). If the state of the leaf node is 'ACTIVE', then the method proceeds to wait for the next node event as indicated through the connector G. However, if the state of the leaf node is 'IDLE', then the method proceeds to set the state of the leaf node to 'ACTIVE' and announce to neighboring nodes that a leaf node has joined the root node (block 1326).

Figure 14:
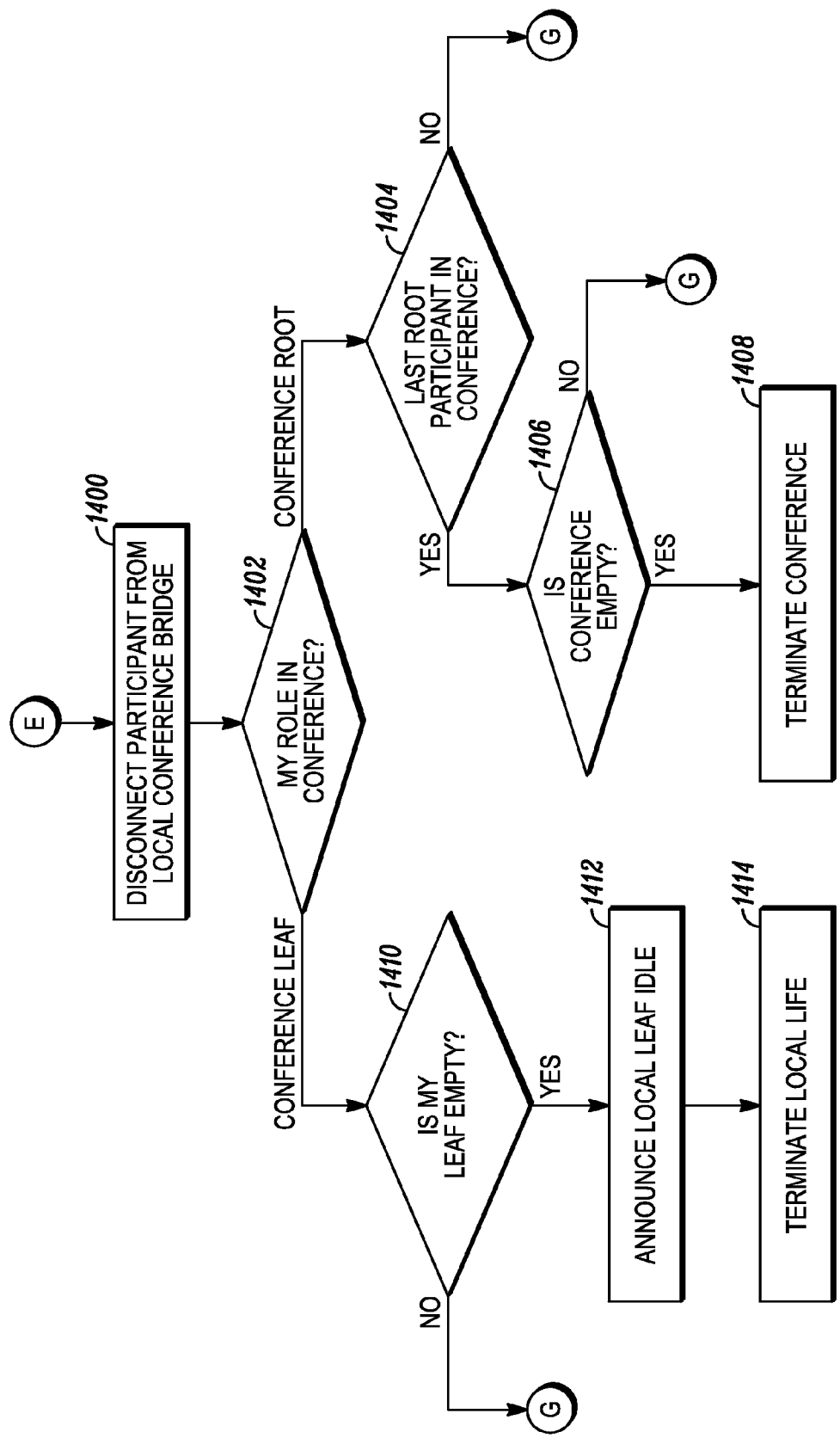
FIG. 14 is a logical flowchart illustrating a method for handling a remove request in accordance with some embodiments.

FIG. 14 illustrates a logical flowchart showing an illustrative method for handling a disconnect request in accordance with some embodiments. In particular, FIG. 14 depicts the flow of the node controller's activity upon a new disconnect participant request from the Focus server. Recall that from FIG. 9, the node controller has determined that the Focus server event is a request to disconnect a participant, with the method continuing to disconnect a participant from the conference (block 916). Thus continuing in FIG. 14, as indicated by the connector E, the method advances to disconnect a participant from a local conference (block 1400).

After such disconnect, the current node identifies its role (e.g., 'My Role') in the conference (block 1402). If the current node is determined to be a root node, then the root node determines whether it is the last root node participant in the conference (block 1404). If not, then the method proceeds to wait for the next node event as indicated through the connector G. If the root node determines that it is the last root node participant in the conference (block 1404), the root node determines whether the conference list is empty (block 1406). If not, then the method proceeds to wait for the next node event as indicated through the connector G. If the root node determines that the conference list is empty (block 1406), then the conference is terminated (block 1408).

If the current node identifies its role in the conference (block 1402) to be a leaf node, then the leaf node determines whether it includes no participants or is an empty leaf (block 1410). If not, then the method proceeds to wait for the next node event as indicated through the connector G. If the leaf node determines that it is an empty leaf (block 1410), then the leaf node announces itself to neighboring nodes as an 'IDLE' leaf (block 1412) before the leaf is terminated (block 1414).

Figure 15:
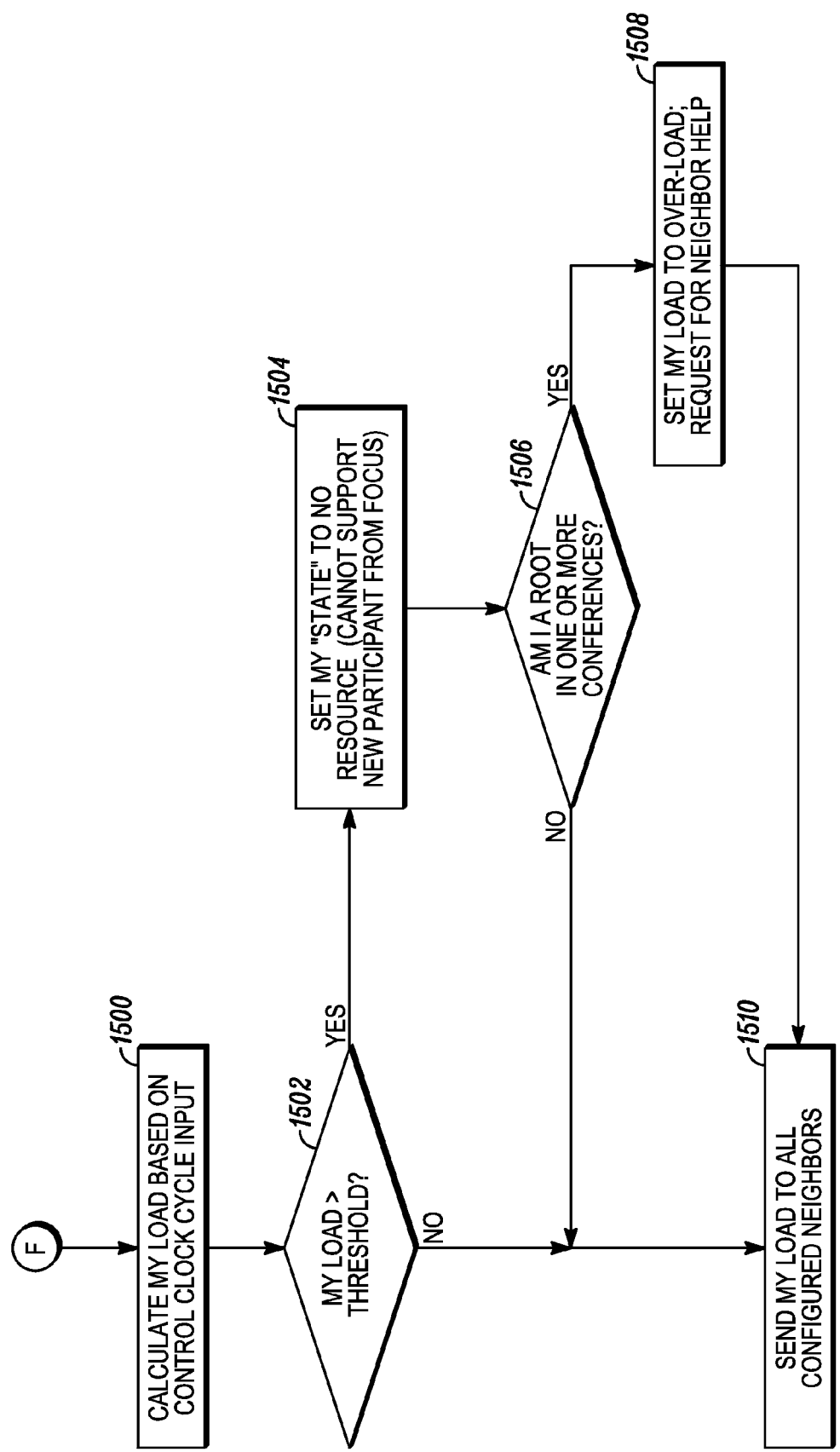
FIG. 15 is a logical flowchart illustrating a method for handling a periodic load update in accordance with some embodiments.

Referring now to FIG. 15, a logical flowchart showing an illustrative method for a periodic node load update in accordance with various embodiments is illustrated. From FIG. 9, the node controller has determined that the internal event is a periodic load update event, with the method advancing to a local node load update process (block 920). Thus continuing in FIG. 15 as indicated by the connector F, the method proceeds to calculate the current node's load (e.g., 'My Load') (block 1500). The load is computed at periodic intervals based on a control clock cycle.

The computed load is compared to a threshold value (block 1502). If the current node cannot support a new participant from the Focus server such that the computed load is greater than the threshold value, then a state of the current node, also referred to as 'My State', is set to a no resource condition (block 1504). In some embodiments, a node's 'My State' value is stored in a volatile memory that interfaces the node controller.

The current node then assesses whether it is a root node in one or more conferences (block 1506). If the current node determines that it is a root node in one or more conferences, then its load (e.g., 'My Load') is set to an overload condition and redistribution of the load or "assistance" is requested from neighboring nodes (block 1508). If the current node determines that it is not a root node in any conference, then the current node's load value is sent to all neighboring nodes (block 1510). Returning to block 1502, if the computed load is not greater than the threshold value, then the current node's load value is sent to all neighboring nodes (block 1510).

In various conferencing architectures including the described "self-forming" decoupled cascaded mixer node architecture, it would be beneficial to identify active talkers in a conference call. In existing architectures, for example a central mixer node architecture, such so-called "talker identification" is achieved by way of the central mixer node directly identifying the talkers within a conference to the Focus server. This identification is done over an existing Focus server-to-mixer node control protocol, and it is based on talkers' RTP IP/port information. The Focus server translates such information directly to the active talkers' SIP:URI or Tel:URI. However, for the "self-forming" decoupled cascaded mixer node architecture, this general approach to talker identification cannot be readily implemented, for example, because the mixing operation is spread out among the decoupled, distributed cascaded mixer nodes.

Thus, to enable talker identification in the various embodiments of the present disclosure, a set of reporting rules (or methods) are herein described that allow the Focus server to identify active talkers in a conference based on information received from all mixer nodes in the decoupled, cascaded mixer node system. The rules as described below provide for talker identification for both low bit rate conferences (e.g., push-to-talk, PTT, conferences) and high bit rate conferences.

Figure 16:
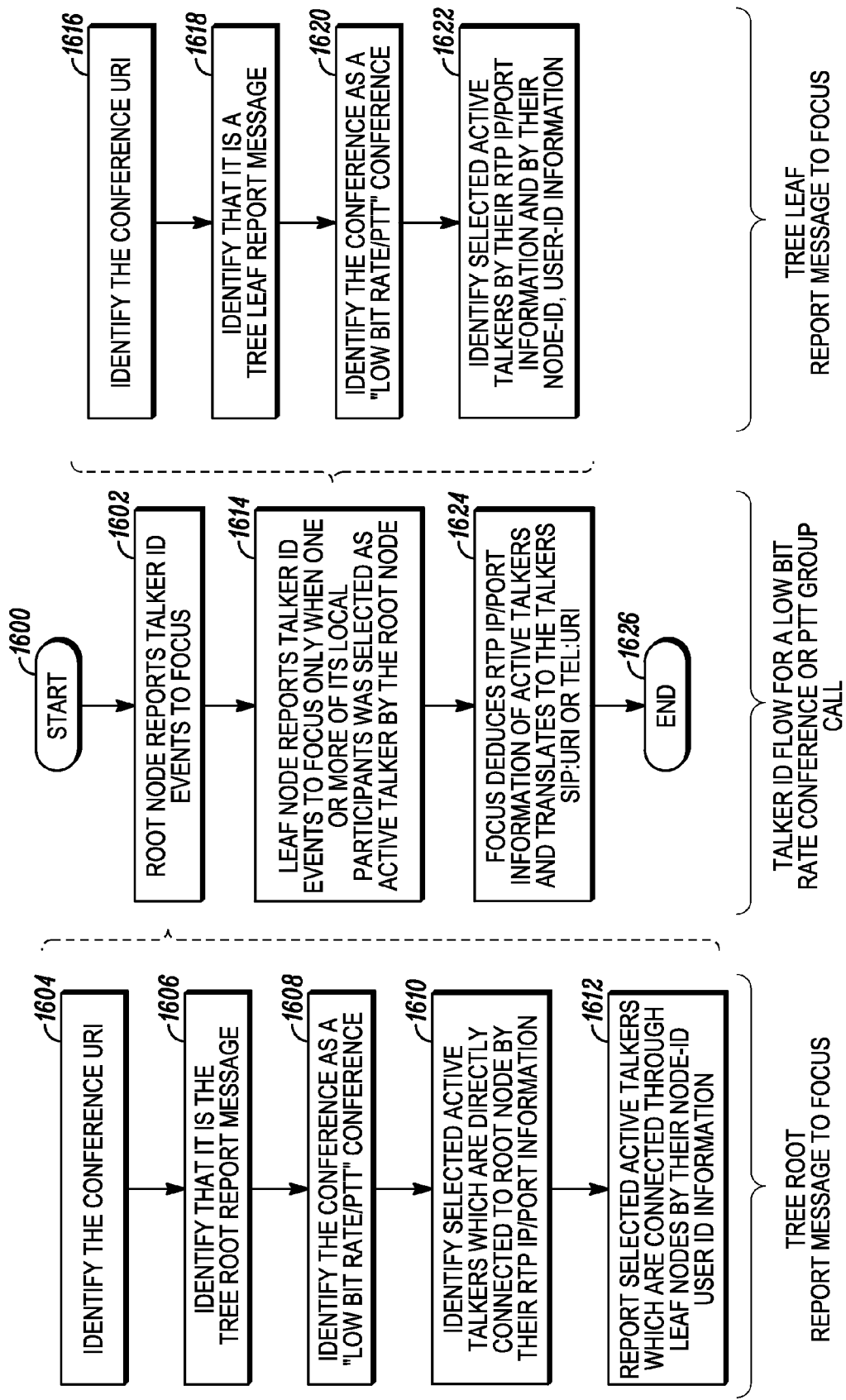
FIG. 16 is a logical flowchart illustrating a method for talker identification in accordance with some embodiments.

FIG. 16 illustrates a logical flowchart showing at least one illustrative method for talker identification. In particular, FIG. 16 shows a method for talker identification in a low bit rate conference on a "self-forming" decoupled cascaded mixer node system. For a low bit rate conference, or PTT group call, definite/established/subscribed talkers in the call are decided at the root node, however the root node does not know the RTP IP/port information of participants connected through leaf nodes. Instead, the root node only knows the Node-ID and the User-ID of participants connected through leaf nodes that are part of the CMfP protocol.

The method of FIG. 16 starts (block 1600) and proceeds to having a root node report talker ID events to the Focus server (block 1602). As shown, the root node report message to the Focus server designates the Conference URI (block 1604). The root node report message to the Focus server then identifies itself as the "tree root report" message (block 1606) and the conference as a "low bit rate/PTT (push-to-talk)" conference (block 1608). Thereafter, the root node report message identifies selected active talkers that are directly connected to the root node by their RTP IP/port information (block 1610). At block 1612, the selected active talkers connected through leaf nodes are reported by their Node-ID and User-ID information.

After the root node reports talker ID events to the Focus server (block 1602), the leaf node reports talker ID events to the Focus server (block 1614). However, the leaf node only reports talker ID events to the Focus server when one or more of its participants is selected as an active talker by the root node.

As shown, the leaf node report message to the Focus server designates the Conference URI (block 1616), then identifies itself as the "tree leaf report" message (block 1618) and the conference as a "low bit rate/PTT" conference (block 1620). Thereafter, the leaf node report message identifies selected active talkers by their RTP IP/port information, by their Node-ID information, and by their User-ID information (block 1622).

Once the root node and the leaf node have reported their talker ID events to the Focus server (blocks 1602 and 1614 respectively), the Focus server gathers/receives the tree root report and the tree leaf report messages from the root node and leaf nodes and deduces the RTP IP/port information of the active talkers (block 1624). This deduction is accomplished by correlating/comparing portions of the tree root report message, such as Node-ID and User-ID information for selected active talkers connected through leaf nodes, with portions of the tree leaf report message, such as RTP IP/port information, Node-ID and User-ID information for selected active talkers. Illustratively, matching/corresponding talker identifying information as reported from both the root node and leaf nodes is used to identify active talkers. In particular, the Focus server translates the correlated information directly to the talkers SIP:URI or Tel:URI and the method ends (block 1626).

Figure 17:
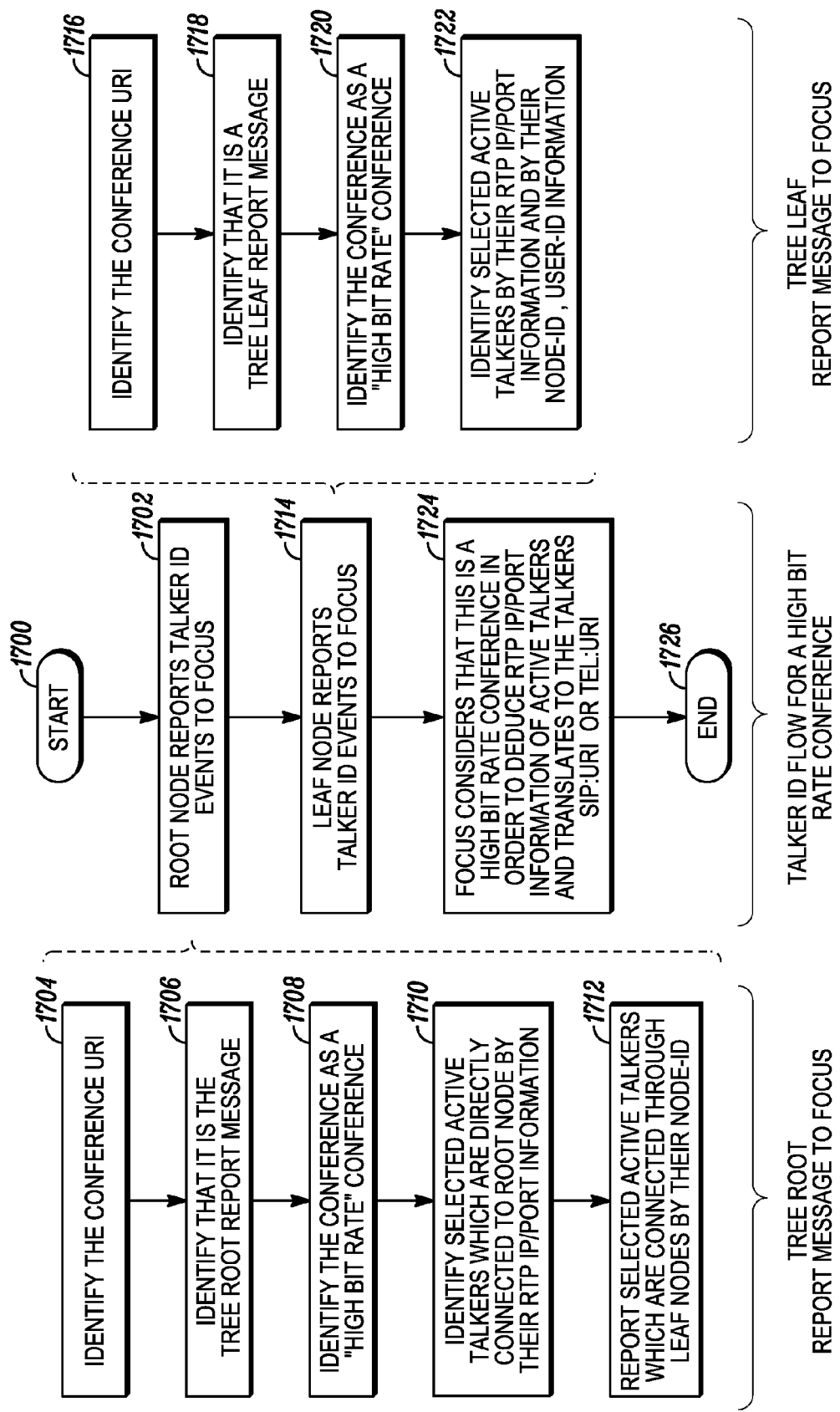
FIG. 17 is a logical flowchart illustrating a method for talker identification in accordance with alternative embodiments.

FIG. 17 illustrates a logical flowchart showing an illustrative method for talker identification in accordance with alternative embodiments. In particular, FIG. 17 shows a method for talker identification in a high bit rate conference on a "self-forming" decoupled cascaded mixer node system.

In one illustrative embodiment for a high bit rate conference such as a G.711 conference call, all of the active talkers are mixed together in two stages: (1) a leaf mix, and (2) a root mix. The two-stage mixing is done with no selection employed.

Overall, the method for talker identification for a high bit rate conference shown in FIG. 17 is similar to the case for a low bit rate conference as illustrated in FIG. 16. Particularly, blocks 1702, 1704, 1706, 1710, 1716, 1718, 1722, and 1724 are the same as in the counterpart blocks of FIG. 16. Illustratively, however the tree root report message and the tree leaf report message each identify the conference as a "high bit rate" conference rather than a low bit rate/PTT conference (blocks 1708 and 1720 respectively). Also, the tree root report message identifies selected active talkers that are connected through leaf nodes only by their Node-ID information rather than by both Node-ID and User-ID information (block 1712). Identification by only Node-ID information occurs as the root node does not know specifically who is talking at a particular leaf node. Furthermore, the leaf nodes always report talker ID events to the Focus server rather than only when one or more of its local participants is selected as an active talker by the root node (block 1714). Another aspect among others for high bit rate conferences is that the Focus server takes into account that the conference is a high bit rate conference when deducing the RTP IP/port information of the active talkers and translating to the talkers SIP:URI or Tel:URI (block 1724).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

In addition to the general-purpose computer system suitable for implementing one or more embodiments as shown in FIG. 8, it will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for inter-node signaling in a conferencing network, the method comprising:
    at a first cascaded mixer node:
    selecting a plurality of media flow payloads;
    generating a set of bundled conference payloads associated with a plurality of conference calls, wherein each bundled conference payload includes media flow payloads from the plurality of media flow payloads that are part of the same conference call of the plurality of conference calls, an identifier for the conference call, and a node identifier for each media flow payload in the conference call, and wherein each bundled conference payload further identifies for each media flow payload in the conference call whether the first cascaded mixer node is a root node or a leaf node;
    bundling the set of bundled conference payloads into a payload of a single packet; and
    sending the single packet to a second cascaded mixer node.

2. The method of claim 1, wherein the single packet is a single Internet Protocol packet.

3. The method of claim 1, wherein the single packet further comprises a node load field that includes a measure of: a number of conference participants connected to the first cascaded mixer node, a number of tree roots currently running on the first cascaded mixer node, and a number of leaves currently running on the first cascaded mixer node.

4. The method of claim 1, wherein at least one bundled conference payload comprises a single combined media flow payload that includes a summation of two or more different media flow payloads, wherein the node identifier for the different media flow payloads is a single node identifier.

5. The method of claim 1, wherein at least one bundled conference payload comprises two or more different individual media flow payloads, wherein each of the individual media flow payloads is associated with a participant identifier that identifies a conference participant that sent the media flow payload, and wherein the node identifier for each individual media flow payload identifies a cascaded mixer node to which the conference participant is connected.

6. The method of claim 1, wherein the first cascaded mixer node comprises a cascaded mixers framer, and wherein the set of bundled conference payloads are bundled into a payload of a single packet by the cascaded mixers framer.

7. A mixer node capable of inter-node signaling in a conferencing network, the mixer node comprising:
    a node controller that is configured to select a plurality of media flow payloads, generate a set of bundled conference payloads associated with a plurality of conference calls, wherein each bundled conference payload includes media flow payloads from the plurality of media flow payloads that are part of the same conference call of the plurality of conference calls, an identifier for the conference call, and a node identifier for each media flow payload in the conference call, and wherein each bundled conference payload further identifies for each media flow payload in the conference call whether the mixer node is a root node or a leaf node; and
    a mixer node framer that is configured to bundle the set of bundled conference payloads into a payload of a single packet and send the single packet to another mixer node.

8. The mixer node of claim 7, wherein the single packet is a single Internet Protocol packet.

9. The mixer node of claim 7, wherein the single packet further comprises a node load field that includes a measure of: a number of conference participants connected to the first cascaded mixer node, a number of tree roots currently running on the first cascaded mixer node, and a number of leaves currently running on the first cascaded mixer node.

10. The mixer node of claim 7, wherein at least one bundled conference payload comprises a single combined media flow payload that includes a summation of two or more different media flow payloads, wherein the node identifier for the different media flow payloads is a single node identifier.

11. The mixer node of claim 7, wherein at least one bundled conference payload comprises two or more different individual media flow payloads, wherein each of the individual media flow payloads is associated with a participant identifier that identifies a conference participant that sent the media flow payload, and wherein the node identifier for each individual media flow payload identifies a cascaded mixer node to which the conference participant is connected.

12. The method of claim 1, wherein the single packet comprises a header attached to the set of bundled conference payloads and wherein each bundled conference payload of the set of bundled conference payloads includes, in association with each individual media flow payload that is part of the bundled conference payload, a participant identifier that identifies a conference participant that sent the individual media flow payload.

13. The mixer node of claim 7, wherein the single packet comprises a header attached to the set of bundled conference payloads and wherein the node controller is configured to include, in each bundled conference payload of the set of bundled conference payloads and in association with each individual media flow payload that is part of the bundled conference payload, a participant identifier that identifies a conference participant that sent the individual media flow payload.

\* \* \* \* \*

UNITED STATES PATENT AND TRADEMARK OFFICE
CERTIFICATE OF CORRECTION

| | | |
|---|---|---|
| PATENT NO. | : 8,937,889 B2 | Page 1 of 1 |
| APPLICATION NO. | : 13/434721 | |
| DATED | : January 20, 2015 | |
| INVENTOR(S) | : Eitan Koren et al. | |

It is certified that error appears in the above-identified patent and that said Letters Patent is hereby corrected as shown below:

IN THE TITLE PAGE:

In Item (54), in Column 1, Line 2, delete "ARCHITECHTURE" and insert -- ARCHITECTURE --, therefor.

In Item (75), under "Inventors," in Column 1, Line 1, delete "Raanana" and insert -- Ra'anana --, therefor.

In Item (75), under "Inventors," in Column 1, Line 2, delete "Tel Aviv-Yaffo" and insert -- Tel Aviv-Yafo --, therefor.

In Item (56), under "OTHER PUBLICATIONS," in Column 2, Line 1, delete "Mul Timedia" and insert -- Multimedia --, therefor.

On Page 2, in Item (56), under "OTHER PUBLICATIONS," in Column 2, Line 13, delete "Interenet" and insert -- Internet --, therefor.

IN THE SPECIFICATION:

In Column 1, Line 2, delete "ARCHITECHTURE" and insert -- ARCHITECTURE --, therefor.

In Column 6, Line 5, delete "thereof" and insert -- thereof. --, therefor.

In Column 7, Line 38, delete "leaf" and insert -- leaf. --, therefor.

Signed and Sealed this
Twelfth Day of July, 2016

Michelle K. Lee
*Director of the United States Patent and Trademark Office*